(12) United States Patent  
Hara et al.

(10) Patent No.: US 9,132,381 B2
(45) Date of Patent: Sep. 15, 2015

(54) HYDROGEN SEPARATION DEVICE

(75) Inventors: Shigeki Hara, Tsukuba (JP); Masakazu Mukaida, Tsukuba (JP); Hiroyuki Suda, Tuskuba (JP); Kenji Haraya, Tsukuba (JP)

(73) Assignee: NATIONAL INSTITUTE OF ADVANCED INDUSTRIAL SCIENCE ABD TECHNOLOGY, Ibaraki (JP)

( * ) Notice: Subject to any disclaimer, the term of this patent is extended or adjusted under 35 U.S.C. 154(b) by 107 days.

(21) Appl. No.: 13/993,937

(22) PCT Filed: Dec. 13, 2011

(86) PCT No.: PCT/JP2011/078789
§ 371 (c)(1),
(2), (4) Date: Aug. 30, 2013

(87) PCT Pub. No.: WO2012/081576
PCT Pub. Date: Jun. 21, 2012

(65) Prior Publication Data
US 2013/0333569 A1    Dec. 19, 2013

(30) Foreign Application Priority Data

Dec. 14, 2010  (JP) .................................. 2010-277869

(51) Int. Cl.
*B01D 53/22*    (2006.01)
*B01D 63/08*    (2006.01)
(Continued)

(52) U.S. Cl.
CPC .............. *B01D 53/22* (2013.01); *B01D 63/082* (2013.01); *C01B 3/503* (2013.01); *C01B 3/505* (2013.01);
(Continued)

(58) Field of Classification Search
CPC ...... B01D 53/22; B01D 63/08; B01D 63/084; B01D 63/082; B01D 2256/16; C01B 3/503; C01B 3/505; H01M 4/00
USPC ................................. 96/4, 7, 9, 11; 95/55, 56
See application file for complete search history.

(56) References Cited

U.S. PATENT DOCUMENTS 3,344,586 A * 10/1967 Langley et al. ...................... 96/7
3,486,301 A * 12/1969 Bonnet ............................... 96/7
(Continued)

FOREIGN PATENT DOCUMENTS

JP            49-4158        1/1974
JP         2002-128506       5/2002
(Continued)

OTHER PUBLICATIONS

International Search Report issued Mar. 19, 2012 in corresponding International Application No. PCT/JP2011/078789.

*Primary Examiner* — Jason M Greene
(74) *Attorney, Agent, or Firm* — Wenderoth, Lind & Ponack, L.L.P.

(57) ABSTRACT

The hydrogen separation device comprises a laminate formed by laminating and integrating a hydrogen separation layer, a mixed gas layer kept adjacent to one surface of the hydrogen separation layer and having a mixed gas flow path, and a transmitted gas layer kept adjacent to the other surface of the hydrogen separation layer and having a transmitted gas flow path, and a vessel containing the laminate therein and filled with a buffer gas, wherein a buffer space is provided between the laminate and the inner wall of the vessel in which a buffer gas can reach at least one end face of the laminate in the lamination direction, and wherein the pressure in the buffer space is equal to or higher than the higher one of the pressure in the mixed gas flow path and the pressure in the transmitted gas flow path.

10 Claims, 22 Drawing Sheets

First Embodiment

(51) Int. Cl.
   *C01B 3/50*  (2006.01)
   *H01M 8/06*  (2006.01)

(52) U.S. Cl.
   CPC ..... *B01D 2256/16* (2013.01); *C01B 2203/0405* (2013.01); *C01B 2203/047* (2013.01); *C01B 2203/0475* (2013.01); *H01M 8/0687* (2013.01)

(56) References Cited

U.S. PATENT DOCUMENTS

| | | | |
|---|---|---|---|
| 6,419,726 B1* | 7/2002 | Frost et al. | 95/56 |
| 6,764,787 B2* | 7/2004 | Grasso et al. | 96/7 |
| 7,311,760 B2* | 12/2007 | Matsumura et al. | 96/4 |
| 7,323,040 B2* | 1/2008 | Poschmann | 96/9 |
| 7,585,355 B2* | 9/2009 | Gonjo et al. | 96/9 |
| 7,686,868 B2* | 3/2010 | Rubas | 96/7 |
| 7,771,519 B2* | 8/2010 | Carolan et al. | 96/7 |
| 7,938,868 B2* | 5/2011 | Gernot et al. | 96/4 |
| 2007/0266631 A1* | 11/2007 | Pledger et al. | 48/61 |
| 2010/0068132 A1* | 3/2010 | Vencill et al. | 96/9 |
| 2014/0298994 A1* | 10/2014 | Park et al. | 96/11 |

FOREIGN PATENT DOCUMENTS

| | | |
|---|---|---|
| JP | 2003-34506 | 2/2003 |
| JP | 2003-81611 | 3/2003 |
| JP | 2005-503314 | 2/2005 |
| JP | 2005-288290 | 10/2005 |
| JP | 2005-296746 | 10/2005 |
| WO | 03/026776 | 4/2003 |

* cited by examiner

First Embodiment

A-B Cross Section

A-B Cross Section

C-D Cross Section

Third Embodiment

A-B Cross Section

C-D Cross Section

Mixed Gas Layer

Fourth Embodiment

A-B Cross Section

Fifth Embodiment

A-B Cross Section

C-D Cross Section

Example 3

A-B Cross Section

HYDROGEN SEPARATION DEVICE

TECHNICAL FIELD

The present invention relates to a hydrogen separation device for separating hydrogen from a hydrogen-containing gas by the use of a hydrogen-permeable film such as a metal film or the like through which hydrogen can selectively pass.

BACKGROUND ART

As a hydrogen separation device of the type, there is known a laminate-type device that comprises a mixed gas layer for supplying a hydrogen-containing gas and a transmitted gas layer for collecting transmitted hydrogen, as laminated on each other via a hydrogen separation layer of a hydrogen permeable film sandwiched therebetween (for example, see PTL 1-6).

Thus designed, such a laminate-type hydrogen separation device makes it possible to incorporate a large number of hydrogen permeable films in the compact device and enables collection of much hydrogen.

However, in the laminate-type hydrogen separation device, it is unexpectedly difficult to completely separate the mixed gas layer and the transmitted gas layer from each other via the hydrogen separation layer. For example, in PTL 1, there is disclosed a structure equipped with a leakage prevention mechanism between the gas inflow port of the mixed gas layer and the gas inflow port of the transmitted gas layer. However, nothing is referred to therein relating to a seal between the hydrogen separation layer, the mixed gas layer and the transmitted gas layer.

The seal between the layers constituting the laminate must realize airtight contact between the facing surfaces, to which, therefore, a technique of sealing up with a line such as a knife edge could not be applied. The layers that constitute the laminate are thin and are difficult to seal up by bonding through welding. Moreover, the most-advanced hydrogen permeable film that is used for the hydrogen separation layer is mechanically and thermally weak, and in many cases therefore, they must be sealed up by bonding under mild conditions.

Specifically, the laminate must be so constructed as not to detract from the hydrogen separation capability of the hydrogen separation layer therein and, in addition, must realize a sufficient seal of the constitutive layers. In case where the layers are insufficiently sealed up, then not only some components of the mixed gas layer would mix in the transmitted gas layer to worsen the quality of hydrogen of the transmitted gas but also, as the case may be, air outside the laminate would mix in the transmitted gas.

CITATION LIST

Patent Literature

PTL 1: JP-A 2002-128506
PTL 2 JP-A 2003-81611
PTL 3: JP-A 2003-34506
PTL 4: JP-A 2005-288290
PTL 5: JP-A 2005-296746
PTL 6: JP-A 2005-503314

SUMMARY OF INVENTION

Technical Problem

An object of the present invention is to solve the prior-art problems as above and to provide a laminate-type hydrogen separation device capable of being constructed under mild conditions and capable of realizing an excellent seal.

Solution to Problem

For solving the problems, the inventors constructed various types of laminates and investigated the capabilities thereof, and during the process, found that it would be difficult to attain a sufficient seal according to an ordinary method of clamping with bolts or diffusion bonding. Consequently, from a different viewpoint, the inventors assiduously studied a method of realizing an excellent seal and, as a result, have noted that it is effective to daringly put the laminate that could function as a hydrogen separation device even by itself, in a vessel and to apply a compressive force to the laminate by the use of a high-pressure gas.

In the field site where a hydrogen separation device is needed, in general, various types of gases are used, and therefore it is easy to use a high-pressure gas therein. Further, as a result of investigations of a structure capable of being spontaneously given a compressive force, the inventors have found that the structure of the type can secure not only an excellent seal but also other various advantageous effects such as durability and others, and have completed the present invention.

The hydrogen separation device of the invention comprises a laminate constructed by laminating and integrating a hydrogen separation layer capable of selectively transmitting hydrogen, a mixed gas layer adjacent to the hydrogen separation layer and having a mixed gas flow path through which a hydrogen-containing gas runs, and a transmitted gas layer adjacent to the hydrogen separation layer and having a transmitted gas flow path through which hydrogen having passed through the hydrogen separation layer runs, and a vessel that contains the laminate and is filled with a buffer gas.

The hydrogen separation device is so configured that, between the laminate and the inner all of the vessel, a buffer space is provided in which the buffer gas can reach at least one end face in the lamination direction of the laminate, and the pressure in the buffer space is equal to or higher than the higher pressure of the mixed gas flow path and the transmitted gas flow path. Specifically, the device is so configured that the laminate does not have therein an area of which the pressure is higher than that of the buffer space.

As a result, a uniform compressive force is applied to the laminate by the buffer gas, or at least any force to push and expand the laminate to break it is not applied to the laminate, and consequently, the laminate can secure an excellent seal and the structure stability of the laminate is thereby improved.

As the hydrogen separation film, usable here are a hydrogen-permeable metal film, a composite film having a thin hydrogen-permeable metal layer formed on a porous ceramic substance, a porous ceramic film having molecular-scale pores, a dense perovskite ceramic film capable of selectively transmitting hydrogen, etc.

As the metal film, usable here are various films such as a Pd film, a Pd—Ag alloy film, a Pd—Cu alloy film, a V—Ni alloy film, an amorphous Zr—Ni alloy film, etc. Recently, techniques of thinning films mainly for the purpose of increasing the hydrogen permeation rate through the films have improved remarkably, and foil-like films having a thickness of less than 20 μm have been disclosed. Such foil-like films are usable in the invention.

The hydrogen separation layer comprises three sections. Specifically, the layer comprises a hydrogen-permeable part that is not kept in contact with the mixed gas layer or the transmitted gas layer and is capable of transmitting hydrogen, a seal part that is kept in contact with the constitutive member of the mixed gas layer or the transmitted gas layer adjacent to the periphery of the hydrogen-permeable part, and a through-hole that is provided inside the region of the seal part to constitute an interlayer communicating hole.

The hydrogen separation layer is not always required to have hydrogen permeability in its entire surface, and in particular, the seal part thereof is not required to have hydrogen permeability. In addition, the constitution and the composition of the hydrogen-permeable part may also be gradually changed so that the hydrogen permeability of the part could be lower around the seal part. For example, the hydrogen-permeable part may be formed of Pd, and an Ni component may be added thereto increasingly in the direction toward the seal part so that the seal part could be formed of Ni.

It is known that the hydrogen-permeable metal film dissolves hydrogen and swells while hydrogen passes therethrough, and in addition, the mechanical strength lowers. Therefore, having the constitution as above, the hydrogen solubility of the film could be lowered in the part nearer to the seal part, since the hydrogen solubility of Ni is lower than that of Pd.

As a result, the strain between the hydrogen-permeable metal film that swells during hydrogen permeation and the seal part of a non-swelling layer adjacent to the metal film could be dispersed, and therefore the film comes to be hardly broken.

Like the hydrogen separation layer, the mixed gas layer and the transmitted gas layer each also comprise three sections. Specifically, the layers each comprise a hydrogen-permeable part-corresponding region which is not in contact with the constitutive member of the adjacent hydrogen separation layer and through which, in accordance with the hydrogen permeation part of the hydrogen separation layer, a vapor such as hydrogen or the like runs, a seal part that surrounds the entire periphery of the gas flow path that is exposed out on the surface and is kept in contact with the constitutive member of the adjacent hydrogen separation layer, and a through-hole that is provided inside the region of the seal part to constitute an interlayer communicating hole. Further, in the seal part, there is provided an intralayer connecting flow path that connects the hydrogen-permeable part-corresponding region and the through-hole.

The mixed gas flow path in the invention indicates the space in which a mixed gas could run in the hydrogen-permeable part-corresponding region and the intralayer connecting flow path that communicates with the space. The transmitted gas flow path indicates the space in which the hydrogen gas that has passed through the hydrogen separation layer could run in the hydrogen-permeable part-corresponding region and the intralayer connecting flow path that communicates with the space. Specifically, hydrogen could not flow in the intralayer connecting flow path that is upstream the hydrogen-permeable part-corresponding region; however, the intralayer connecting flow path of the type is also within the range of the transmitted gas flow path.

The mixed gas layer and the transmitted gas layer each may be so configured that the mixed gas flow path or the transmitted gas flow path in the hydrogen-permeable part-corresponding region is exposed out only on one surface and the hydrogen separation layer is provided only on that one surface; however, it is desirable that the mixed gas flow path or the transmitted gas flow path in the hydrogen-permeable part-corresponding region is exposed out on both surfaces and the hydrogen separation layer is provide on both of those surfaces, since the laminate could be made to be compact when a large number of hydrogen separation layers are provided therein.

In case where the mixed gas layer and the transmitted gas layer each are so configured that the mixed gas flow path or the transmitted gas flow path in the hydrogen-permeable part-corresponding region is exposed out only on one surface and the hydrogen separation layer is provided only on that one surface, when the end face of the mixed gas layer or the transmitted gas layer that it to be the end part in the lamination direction of the laminate is so designed as to have pipe erection, then the end plate to be mentioned below is not always necessary.

In case where the hydrogen separation layer is provided on both surfaces of the mixed gas layer and the transmitted gas layer, the mixed gas layer and the transmitted gas layer are alternately provided in the lamination direction via the hydrogen separation layer put therebetween, and at the end face of the mixed gas layer or the transmitted gas layer to be the end part in the lamination direction of the laminate, there is provided an end plate to block and seal up the end face.

The end plate has a hydrogen-permeable part-corresponding region and a seal part kept in contact with the constitutive member of the mixed gas layer or the transmitted gas layer adjacent to the region. The hydrogen-permeable part-corresponding region in the end plate is only for blocking up the mixed gas flow path or the transmitted gas flow path in the hydrogen-permeable part-corresponding region of the mixed gas layer or the transmitted gas layer adjacent thereto, and does not require any specific constitution. The end plate on the side with pipe erection may be so designed as to be provided with a gas flow path such as a through-hole or the like to connect the pipe and the interlayer communicating hole.

For integrating the hydrogen separation layer, the mixed gas layer and the transmitted gas layer (and optionally the end plate and the plate for pipe connection to be mentioned below), there may be suitably employed clamping with bolts, diffusion bonding, brazing, etc. In assembling the hydrogen separation device, it is desirable that any high temperature or great force is not applied to the hydrogen separation layer.

According to the invention, the laminate may be good to be integrated, and does not require any firm bonding. In assembling with bolts, the number of the bolts may be reduced and the bolts may be thinned. As a result, the hydrogen separation device can be made to be compact.

In diffusion bonding or brazing, the heat treatment temperature for bonding may be lowered and the bonding may take a short period of time. In addition, the pressure in bonding may be lowered. According to the invention, therefore, the hydrogen separation device that uses, as the hydrogen separation layer therein, the hydrogen-permeable film of the type formed of a thin foil-like film or a brittle ceramic substance that has a susceptibility to high temperature and is readily deformed can be assembled.

The hydrogen separation device is required to satisfy airtightness inside and outside the device. Using the tough vessel, in the invention, the device can readily secure the airtightness. The hydrogen separation device comprising a conventional laminate could hardly secure the airtightness inside and outside the laminate. The interlayer seal must realize airtight contact between the facing surfaces, and a technique of sealing up with a line such as a knife edge could not be applied thereto. In addition, since the device is operated at a few hundred ° C., a polymer-made gasket could not be used therein. In case where welding as an airtight and reliable sealing technique is applied to a laminate of thin layered members, there would be a risk of detracting from the complicated configuration and the performance of the hydrogen separation layer.

According to the invention, the vessel is separated from the laminate and the vessel can be sealed up by welding to thereby easily realize high-level airtightness. As a result, even when the laminate is broken during use, hydrogen does not leak out of the hydrogen separation device, and the device is therefore safe.

As the buffer gas to be charged in the vessel, hydrogen, water vapor or an inert gas is preferably introduced thereinto. In case where hydrogen is introduced, the purity of the transmitted gas does not lower even though the laminate has a leak caused by bonding failure, since hydrogen that surrounds the laminate would flow into the laminate. Hydrogen that is introduced as the buffer gas is not always required to be high-purity hydrogen. In case where the amount of high-purity hydrogen that passes through the hydrogen separation layer is sufficiently larger than that of hydrogen to mix in the transmitted gas through leakage, the impurity in the hydrogen to mix therein through leakage would be on an ignorable level.

In case where the hydrogen that has been transmitted by introducing water vapor into the transmitted gas flow path is swept, water vapor can be used as the buffer gas. Even though the laminate has a leak caused by bonding failure, water vapor may run into the device and therefore does not detract from the quality of the transmitted gas. Water vapor may be introduced from the outside into the hydrogen separation device, but water may be sealed in the vessel to realize the intended function. In general, the hydrogen separation device is driven at 300° C. to 500° C., and at that temperature, water sealed in the vessel changes water vapor and the pressure in the vessel could be higher than the pressure in the mixed gas flow path and the transmitted gas flow path. In that manner, it would be unnecessary to prepare any special water vapor in the system.

In case where an inert gas could be present with no problem in the hydrogen obtained through the hydrogen separation device, an inert gas may be used as the buffer gas. Even though the laminate has a leak caused by bonding failure, the inert gas would merely mix in the transmitted hydrogen with no functional problem.

Further, in case where the hydrogen separation device is so planned that any of the mixed gas flow path or the transmitted gas flow path having a higher pressure communicates with the buffer space, the device configuration could be simplified more. Specifically, the gas itself that runs through the mixed gas flow path or the transmitted gas flow path can be used as the buffer gas, and it is unnecessary to introduce any additional gas into the system.

For example, a technique of preventing the transmitted gas from being contaminated by the impurity having existed in the mixed gas is known, by controlling the pressure in the transmitted gas flow path to be higher than that in the mixed gas flow path in the case where the hydrogen partial pressure of the transmitted gas is lowered by introducing a sweep gas into the transmitted gas flow path for hydrogen permeation through the flow path. In such a case, the transmitted gas flow path may be made to communicate with the buffer space so that there could exist no part in the laminate having a higher pressure than in the buffer space.

In the case, strictly, the pressure in the transmitted gas flow path differs from that in the buffer space owing to the pressure loss through the interlayer communicating hole, etc. However, in case where the transmitted gas flow path communicates with the buffer space in the invention, the pressure in those is considered to be equal to each other. Also in the other case where the mixed gas flow path communicates with the buffer space, the pressure in those is considered to be equal to each other.

In particular, the hydrogen separation device is often more effective where the mixed gas flow path communicates with the buffer space. In the hydrogen separation device where pure hydrogen is obtained from the transmitted gas flow path, the pressure in the mixed gas flow path is higher than that in the transmitted gas flow path during device operation. In this case, the laminate may be prevented from having a part that has a higher pressure than in the buffer space by making the mixed gas flow path communicate with the buffer space. Even though the laminate is broken during operation, any gas having a lower purity than that of the hydrogen-containing gas kept introduced into the device is not discharged out as a transmitted gas, and the device can be driven at ease.

On the other hand, in a hydrogen separation device composed of a laminate alone, when the laminate is broken during operation, air components may mix into the transmitted gas thereby bringing about a serious influence on the system of the latter stage of the hydrogen separation device.

As a method of making the mixed gas flow path communicate with the buffer space, in case where the hydrogen separation device is so designed that the hydrogen-containing gas introduced thereinto could flow toward the mixed gas flow path via the buffer space, then the structure of the hydrogen separation device can be simplified more. The structure of the type can be constructed, for example, by fitting a pipe for introducing a hydrogen-containing gas into the buffer space on the vessel so that the intralayer connecting flow path of the mixed gas flow path in the laminate could be opened to the buffer space.

Through connection to the laminate as above, the number of pipes to connect the flow path in the laminate and the outside area of the vessel can be reduced by one. The pipe erection to the laminate to thereby connect the flow path in the laminate and the outside area of the vessel takes a lot of trouble, and therefore reducing the number of the pipes brings about increasing the production efficiency and yield of the hydrogen separation device. The number of the in-layer connection flow path of the mixed gas flow path to be opened to the buffer space is not always required to be one but, if desired, multiple flow paths may be provided. As the case may be, the structure may be so configured that the interlayer communicating hole to communicate with the intralayer connecting flow path could be opened to the buffer space.

The hydrogen separation device may have two pipes communicating with the laminate to connect the flow path in the laminate and the outside area of the vessel. In the hydrogen separation device not using a sweep gas, the number of the pipe to connect the transmitted gas flow path and the outside area of the vessel could be one. In case where the hydrogen separation device is so designed that the hydrogen-containing gas introduced thereinto could flow through the buffer space to run into the mixed gas flow path, another pipe to take out the gas not having passed through the hydrogen separation layer may be provided therein and the hydrogen separation device may be thereby so configured that two pipes including the above are connected to the laminate.

The constitution as above reduces more the labor in pipe erection, and therefore the production efficiency and yield for the hydrogen separation device can be thereby increased and the structure of the hydrogen separation device can be simplified. The device may also be so configured that the hydrogen-containing gas introduced thereinto is led to the mixed gas flow path via the pipe therebetween and the gas not having passed through the hydrogen separation layer is taken out of the vessel via the buffer space. Also in the structure, the number of the pipes communicating with the laminate is two alone, and the structure could enjoy the same advantageous effects as above.

In case where the hydrogen separation device is so configured that the pipe to connect the flow path in the laminate and the outside area of the vessel is linked to the layer more inner than the end face of the laminate, the laminate therein can be constructed more easily. Specifically, in the case, since the two end faces of the laminate in the lamination direction do not have any complicated constitution of piping or the like, the system can be easily clamped from both ends thereby facilitating diffusion bonding and blazing therein.

In case where the pipe to connect the flow path in the laminate and the outside area of the vessel is linked to the layer more inner than the end face of the laminate, the gas flow path via which the pipe and the interlayer communicating hole are communicated with each other may be provided in the mixed gas layer or in the transmitted gas layer; as the case may be, however, a relatively thick plate for pipe communication having a pipe communicating part in the peripheral surface thereof may be provided as a layer of the laminate, and plate may be worked to have, as formed therein, a gas flow path to communicate the pipe and the interlayer communicating hole with each other.

Preferably, in the hydrogen separation device, the intralayer connecting flow path has a part having a width of at most 1 mm in the in-layer direction. The intralayer connecting flow path includes one for leading the mixed gas introduced thereinto toward the hydrogen-permeable part-corresponding region of the mixed gas flow path, one for discharging the remaining gas not transmitted via the hydrogen-permeable part-corresponding region of the mixed gas flow path, one for introducing a sweep gas into the hydrogen-permeable part-corresponding region of the transmitted gas flow path, and one for taking out the transmitted hydrogen from the transmitted gas flow path, and is communicated with the interlayer communicating hole and the buffer space.

The inventors assembled various types of laminates and investigated the performance thereof, and there occurred a leak between the mixed gas flow path and the transmitted gas flow path in many cases. The inventors investigated the reasons, and have found that the leak is caused by the sealing failure around the intralayer connecting flow path, as described below. With that, the inventors have clarified that when a part having a width of at most 1 mm, preferably at most 0.6 mm in the in-layer direction is provided in the intralayer connecting flow path, then the leak can be readily prevented.

Moreover, the inventors have further found that, when such a part having a width of at most 1 mm, preferably at most 0.6 mm in the in-layer direction is provided in the intralayer connecting flow path, then the gas introduced into the device can flow uniformly in the constitutive layers of the laminate and, as a result, all the layers can effectively function so that the transmission rate through the hydrogen separation device can be enlarged in proportion to the number of the laminated layers.

Further, it is desirable that the mixed gas layer and the transmitted gas layer each are composed of multiple tabular members, at least one of those members has the above-mentioned intralayer connecting flow path, and the flow path is so divided as to prevent planar communication of the hydrogen-permeable part-corresponding region of the tabular member.

It is difficult to secure the sealability of the seal part and to construct the intralayer connecting flow path in the seal part and the hydrogen-separation layer-supporting structure in the hydrogen-permeable part-corresponding region, in one member of the mixed gas layer or the transmitted gas layer. However, when these structures each are composed of multiple tabular members, then it is easy to form the mixed gas layer and the transmitted gas layer In this case, one type of the tabular member has the above-mentioned intralayer connecting flow path, and in the tabular member of the type, the flow path of the hydrogen-permeable part-corresponding region is so divided that the divided parts do not planarly communicate with each other. When another tabular member is provided so as to connect the divided flow paths, then the gas introduced through the intralayer connecting flow path may uniformly run through the system while three-dimensionally meandering therein, and hydrogen can be efficiently separated through the system. Moreover, the structure of every tabular member is simple and the production cost of the device can be thereby reduced.

Of the tabular members, the seal part of the hydrogen separation layer and also the other sealing members that are in airtight contact with the seal part of any other tabular member to enhance the airtightness and the bonding strength of the device may also be so configured that the flow path is divided so as to prevent any planar communication of the divided parts of the path with each other. For the sealing member, often used is a thin and soft material, and therefore, the sealing member composed of the seal part alone would readily deform and is difficult to handle.

Accordingly, even in the sealing member, the flow path may be divided so that the divided parts could not planarly communicate with each other and the divided parts are bridged, whereby the structure may be stabilized and can be handled with ease. In case where some other tabular members are formed to bridge the divided flow paths, the gas introduced into the system can rather uniformly run through the hydrogen-permeable part-corresponding region without detracting from the effective film area, and therefore the hydrogen separation efficiency of the device is thereby increased.

Further, when the hydrogen separation device is so designed that, in the hydrogen-permeable part-corresponding region, the members constituting the hydrogen separation layer and the mixed gas layer and the transmitted gas layer adjacent to the hydrogen separation layer are not kept in airtight contact with each other, then the entire surface of the hydrogen-permeable part could act for hydrogen permeation and, in addition, the constitution of the type is durable to pressure difference. In using a foil-like metal film as the hydrogen separation layer, there is disclosed a method of airtightly integrating a supporting member and the foil-like metal film for compensating for the mechanical strength of the film.

However, the part kept in contact with the supporting member does not transmit hydrogen and therefore the effective film area usable for permeation reduces. Moreover, the inventors constructed various types of laminates and investigated the performance thereof, and have found that, when the laminate is kept in contact with the supporting member, then the hydrogen separation layer rather tends to break in device construction, and it is rather effective not to keep the supporting member in contact with the laminate but to support the laminate with the divided part of the tabular member. Based on the results, the inventors reached the present invention relating to airtight contact between the members in the hydrogen-permeable part-corresponding region.

The invention is characterized by the above, and is summarized as follows:

(1) A hydrogen separation device comprising a laminate formed by laminating and integrating a hydrogen separation layer for selectively transmitting hydrogen, a mixed gas layer kept adjacent to one surface of the hydrogen separation layer and having a mixed gas flow path where a hydrogen-containing gas runs and a seal part to surround the entire periphery of the mixed gas flow path exposed on the surface to be in airtight contact with the hydrogen separation layer, and a transmitted gas layer kept adjacent to the other surface of the hydrogen separation layer and having a transmitted gas flow path where hydrogen having passed through the hydrogen separation layer runs and a seal part to surround the entire periphery of the transmitted gas flow path exposed on the surface to be in airtight contact with the hydrogen separation layer, and a vessel containing the laminate therein and filled with a buffer gas, wherein a buffer space is provided between the laminate and the inner wall of the vessel in which a buffer gas can reach at least one end face of the laminate in the lamination direction, and wherein the pressure in the buffer space is equal to or higher than the higher one of the pressure in the mixed gas flow path and the pressure in the transmitted gas flow path.

(2) The hydrogen separation device according to the above (1), wherein either one of the mixed gas flow path and the transmitted gas flow path having a higher pressure communicates with the buffer space.

(3) The hydrogen separation device according to the above (1), wherein the mixed gas flow path communicates with the buffer space.

(4) The hydrogen separation device according to the above (1), wherein the hydrogen-containing gas runs through the mixed gas flow path via the buffer space.

(5) The hydrogen separation device according to the above (1), wherein two pipes link to the laminate to connect the flow path inside the laminate and the outside area of the vessel.

(6) The hydrogen separation device according to the above (1), wherein the pipe connecting the flow path inside the laminate and the outside area of the vessel is linked to the surface that is vertical to the end face in the lamination direction of the laminate.

(7) The hydrogen separation device according to the above (6), wherein the laminate contains a plate for pipe communication having a larger thickness than the thickness of the mixed gas layer or the thickness of the transmitted gas layer, and the pipe connecting the flow path inside the laminate and the outside area of the vessel is linked to the peripheral surface around the pipe communication plate.

(8) The hydrogen separation device according to the above (1), which has, as provided in the seal part of the mixed gas layer and the transmitted gas layer kept in airtight contact with the hydrogen separation layer, an intralayer connecting flow path that communicates with the hydrogen-permeable part-corresponding region of the mixed gas layer or the transmitted gas layer for gas introduction or emission into or from the hydrogen-permeable part-corresponding region, and in which the intralayer connecting flow path has a part having a width in the in-layer direction of at most 1 mm.

(9) The hydrogen separation device according to the above (1), wherein at least one of the mixed gas layer and the transmitted gas layer is composed of multiple tabular members, at least one tabular member constituting the layer has the intralayer connecting flow path, and the flow path is so divided as not to planarly communicate the divided hydrogen-permeable part-corresponding regions of the tabular member with each other.

(10) The hydrogen separation device according to the above (9), wherein in the hydrogen-permeable part-corresponding region, the tabular member to constitute the mixed gas layer and the transmitted gas layer is not kept in airtight contact with the adjacent hydrogen separation layer.

Advantageous Effects of Invention

According to the invention, there is obtained a hydrogen separation device that comprises a laminate excellent in durability. In addition, the aminate can be constructed and laminated without imparting any high temperature or any large force to the hydrogen separation layer to constitute the laminate, and therefore a film that is thin and brittle but has a higher performance than before can be used as the hydrogen separation layer. In integrating the laminate, any tough bonding is unnecessary and the device can be down-sized. The constitution of the device can be simplified and the production yield of the device can be increased and the production cost thereof can be reduced. Moreover, even though the laminate is broken, the transmitted gas is not contaminated with air and hydrogen does not leak out of the device.

DESCRIPTION OF EMBODIMENTS

Embodiments of the invention are described in detail with reference to the drawings.

Figure 1:
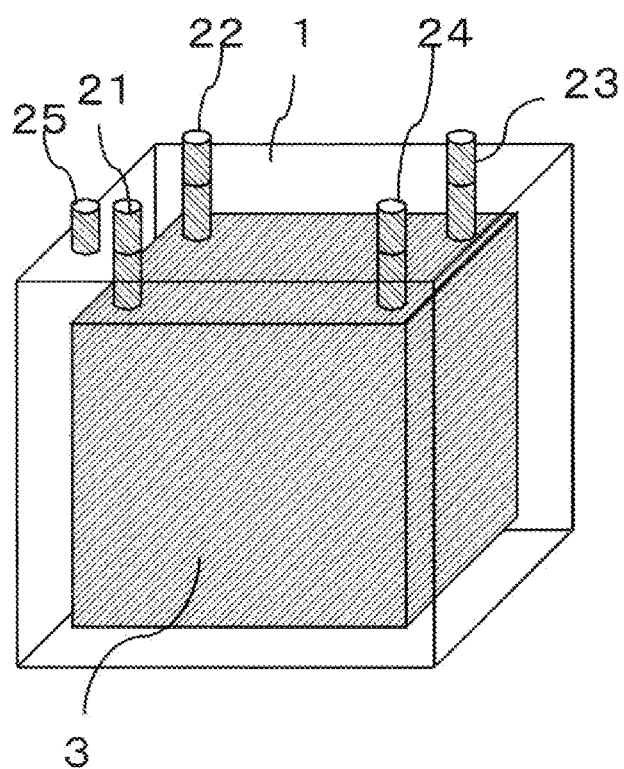
FIG. 1 is a perspective view showing the first embodiment of the hydrogen separation device. (The laminate and the pipe arrangement in the vessel are shown through perspective projection for convenience sake.)

FIG. 1 shows the first embodiment of the hydrogen separation device of the invention. The first embodiment comprises the laminate 3 and the vessel 1 that contains the laminate. In this embodiment, there are provided the mixed gas introduction pipe 21 for introducing a mixed gas from outside the vessel 1 into the laminate 3; the mixed gas discharge pipe 23 for introducing the remaining gas not having passed through the hydrogen separation layer 4, from the laminate 3 to outside the vessel 1; the sweep gas introduction pipe 22 for introducing a sweep gas from outside the vessel 1 to the laminate 3 for the purpose of lowering the hydrogen partial pressure in the transmitted gas flow path; the transmitted gas discharge pipe 24 for introducing the transmitted gas from inside the laminate 3 to outside the vessel 1; and the buffer gas introduction pipe 25 for introducing a buffer gas into the buffer space 11 between the laminate 3 and the inner wall of the vessel 1.

Figure 2:
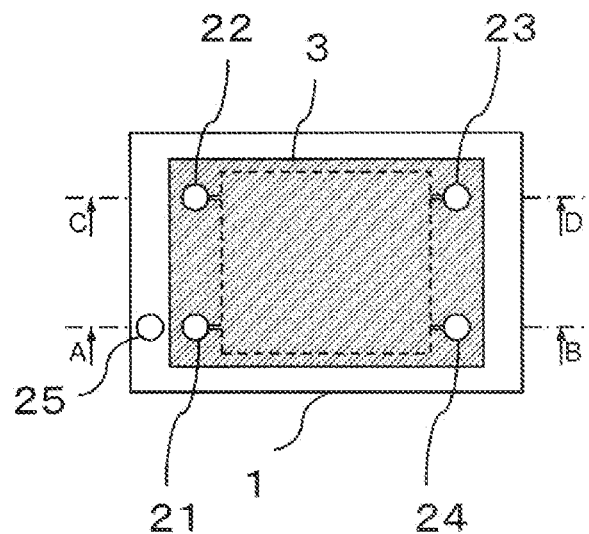
FIG. 2 is a top view showing the first embodiment of the hydrogen separation device. (The laminate in the vessel is shown through perspective projection for convenience sake.)
Figure 3:
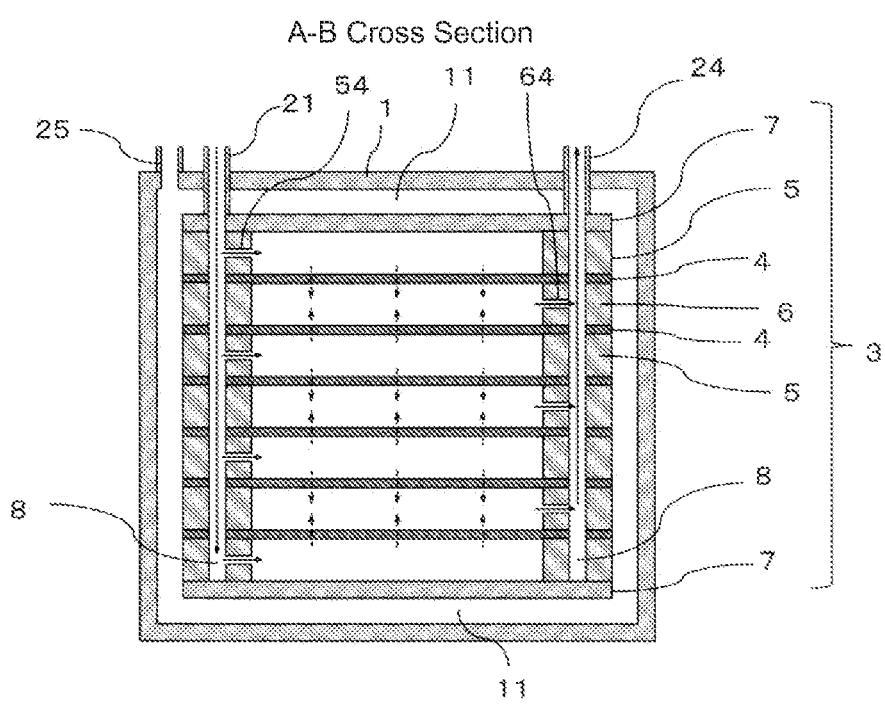
FIG. 3 is an A-B cross-sectional view of FIG. 2.

FIG. 2 is a top view of the above-mentioned hydrogen separation device, in which the A-B cross section is FIG. 3. As shown in FIG. 3, the laminate 3 is a lamination of the hydrogen separation layer 4, the mixed gas layer 5 and the transmitted gas layer 6, which are integrated along with the end plate 7 on both ends in the lamination direction by means of a suitable bonding means of, for example, diffusion bonding, etc.

A mixed gas is introduced into the laminate 3 from outside the vessel 1, and via the interlayer communicating hole 8, the gas is distributed in the four mixed gas layers 5 as illustrated. While the gas runs through the hydrogen-permeable part-corresponding region in the mixed gas flow path, hydrogen passes through the hydrogen separation layer 4 to run into the hydrogen-permeable part-corresponding region in the transmitted gas flow path. This gas is collected via the intralayer connecting flow path 64 and the interlayer communicating hole 8 in the transmitted gas flow path, and is taken out of the vessel 1 through the pipe 24. In that manner, hydrogen can be separated from the mixed gas.

Figure 4:
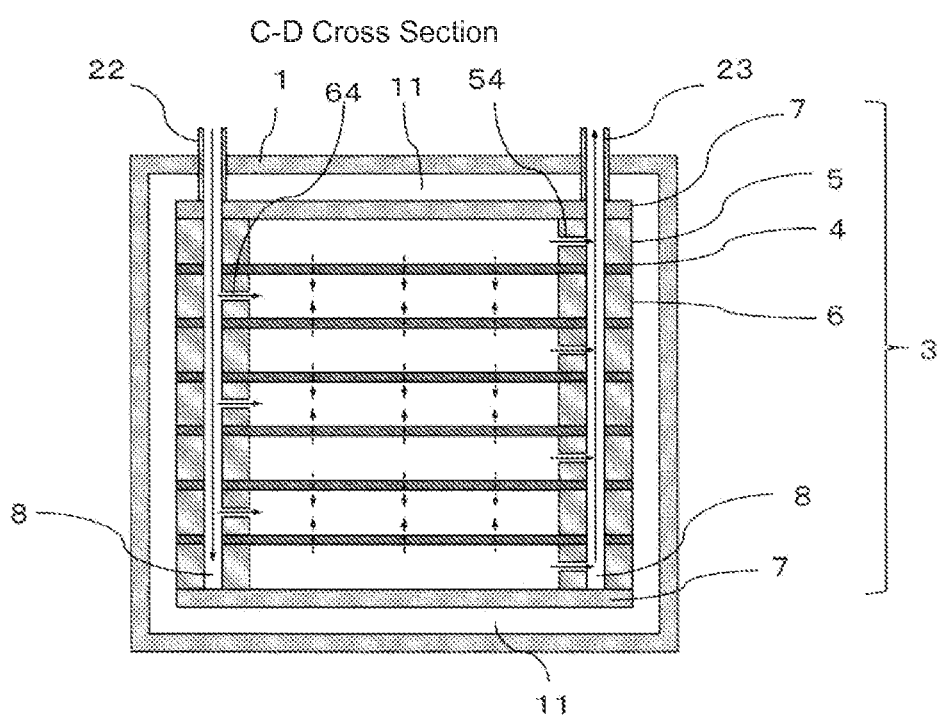
FIG. 4 is a C-D cross-sectional view of FIG. 2.

FIG. 4 shows the C-D cross section of FIG. 2. In the mixed gas layer 5, the gas not having passed through the hydrogen separation layer 4 is collected through the intralayer connecting flow path 54 of the mixed gas flow path and the interlayer communicating hole 8 in this cross section, and is discharged out of the vessel 1 via the pipe 23. On the other hand, a sweep gas is introduced into the hydrogen-permeable part-corresponding region of the transmitted gas flow path through the interlayer communicating hole 8 and the intralayer connecting flow path 64 of the transmitted gas flow path in this cross section.

A gas, for example, the same gas as the sweep gas is introduced into the buffer space 11. The pressure of the gas is made to be equal to or higher than the higher one of the pressure in the mixed gas flow path in the mixed gas layer 5 and the pressure in the transmitted gas flow path in the transmitted gas layer 6, whereby a force to expand and break the laminate 3 by the gas pressure inside the laminate 3 is not given to the device. As a result, the device can have excellent durability. In addition, since the buffer gas and the sweep gas are the same gas, any other component than the mixed gas and the buffer gas does not mix in the transmitted gas even when the sealing of both surfaces of the transmitted gas layer 6 is insufficient or even though the laminate 3 is broken during use. Further, the vessel 1 is sealed up by welding and therefore the reliability of the airtightness thereof can be increased. A hydrogen separation device not using a vessel is risky in that, when the laminate therein is broken, then not only air components would mix in the transmitted gas but also the hydrogen-containing mixed gas would leak out in air.

Figure 5:
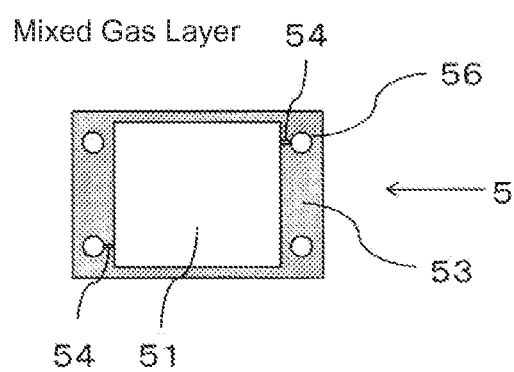
FIG. 5 is a plan view showing the mixed gas layer in the first embodiment.
Figure 6:
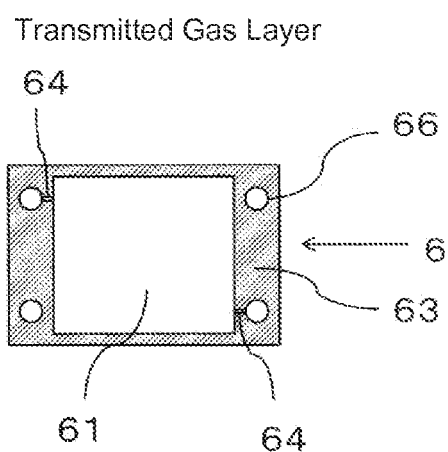
FIG. 6 is a plan view showing the transmitted gas layer in the first embodiment.
Figure 7:
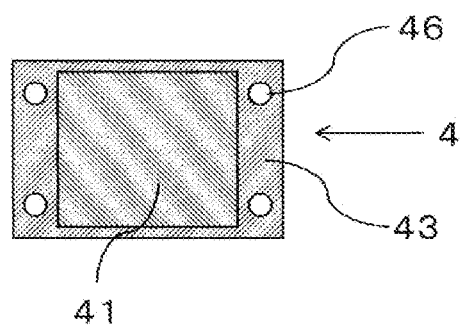
FIG. 7 is a plan view showing the hydrogen separation layer in the first embodiment.

The constitutions of the mixed gas layer 5, the transmitted gas layer 6 and the hydrogen separation layer 4 are shown in FIG. 5, FIG. 6 and FIG. 7, respectively. The mixed gas layer 5, the transmitted gas layer 6 and the hydrogen separation layer 4 all have seal parts 53, 63 and 43 to surround the entire periphery of each layer and have through-holes 56, 66 and 46 at the four corners in the region of the seal parts 53, 63 and 43. These through-holes 56, 66 and 46 each constitute the interlayer communicating hole that runs in the lamination direction when the layers are laminated.

The hydrogen separation layer 4 has the hydrogen-permeable part 41 at the center thereof. The mixed gas layer 5 and the transmitted gas layer 6 each have an opening section at the center thereof, and the section is to be the hydrogen-permeable part-corresponding region 51 of the mixed gas flow path and the hydrogen-permeable part-corresponding region 61 of the transmitted gas flow path. These are hydrogen-permeable part-corresponding regions, through which hydrogen permeation is attained via the adjacent hydrogen separation layer 4.

The seal parts 53 and 63 of the mixed gas layer 5 and the transmitted gas layer 6 are flat for sealing, and inside the seal parts 53 and 63, there are provided intralayer connecting flow paths 54 and 64 not exposed out on the surface of the seal part. Via the intralayer connecting flow paths 54 and 64, therefore, gas can be introduced into the hydrogen-permeable pat-corresponding regions 51 and 61 from the through-hole 56 (or 66 or 46) for the interlayer communicating hole 8, and gas can be taken out from the hydrogen-permeable part-corresponding region 51 and 61 toward the through-hole 56 (or 66 or 46) for the interlayer communicating hole 8.

Preferably, the width of the intralayer connecting flow path is at most 1 mm, preferably at most 0.6 mm. The path may have a width larger than the range, but it is desirable that the path has at least one part of the type. When the width is large, a sufficient pressure could not be given to the seal part of the transmitted gas layer corresponding to the lamination direction of the intralayer connecting flow path 54 of the mixed gas layer, in integrating the laminate; and if so, there may occur a leak.

Specifically, in the transmitted gas layer, the mixed gas would run into the hydrogen-permeable part-corresponding region 61 of the transmitted gas layer via the through-hole (interlayer communicating hole) 66 through which the mixed gas flows in the transmitted gas layer, whereby the quality of the transmitted gas would be degraded. Or else a sufficient pressure could not be given to the seal part of the mixed gas layer corresponding to the lamination direction of the intralayer connecting flow path 64 of the transmitted gas layer, in integrating the laminate, whereby there may also occur a leak. Specifically, the mixed gas would flow into the through-hole (interlayer communicating hole) 56 through which the transmitted gas runs in the mixed gas layer, from the hydrogen-permeable part-corresponding region 51 of the mixed gas layer, and the quality of the transmitted gas would be thereby lowered. In general, the shape of the mixed gas layer 5 and that of the transmitted gas layer 6 are not needed to be the same, but as in this embodiment, the two may have the same configuration when turned back on. Having the configuration of the type, the kinds of the members may be lessened, and the device can be produced at low cost.

Figure 8:
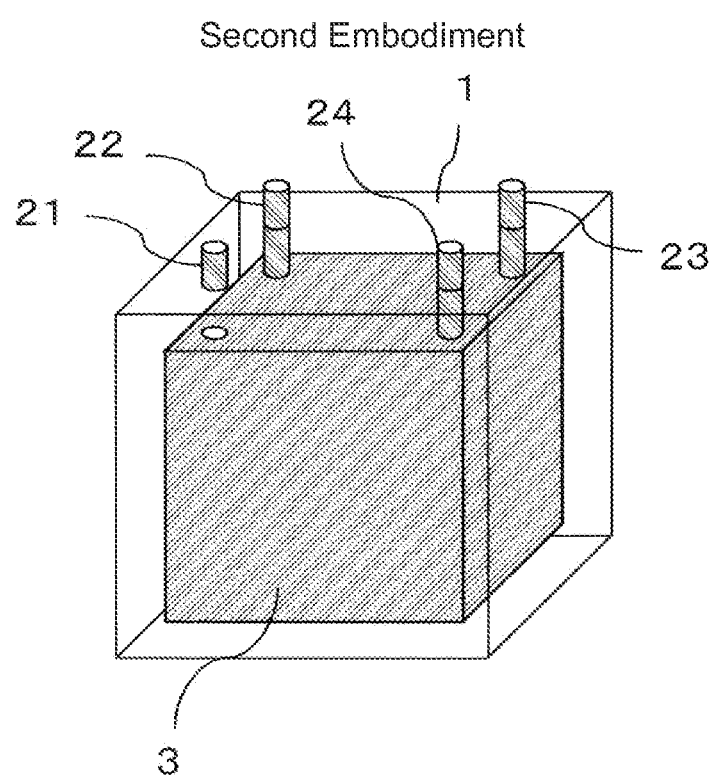
FIG. 8 is a perspective view showing the second embodiment of the hydrogen separation device. (The laminate and the pipe arrangement in the vessel are shown through perspective projection for convenience sake.)

FIG. 8 shows the second embodiment of the hydrogen separation device of the invention. In the second embodiment, the pipe 21 for introducing a mixed gas communicates with the buffer space 11 in the vessel, and the interlayer communicating hole 8 for introducing the mixed gas of the laminate 3 is opened to the inside area of the vessel. Further excepting that the pipe provided for introducing gas between the laminate 3 and the inner wall of the vessel 1 is omitted, the second embodiment has the same configuration as that of the first embodiment. This embodiment is applied to the case where the pressure in the mixed gas flow path 51 (or 54) is equal to or higher than the pressure in the transmitted gas flow path 61 (or 64).

Figure 9:
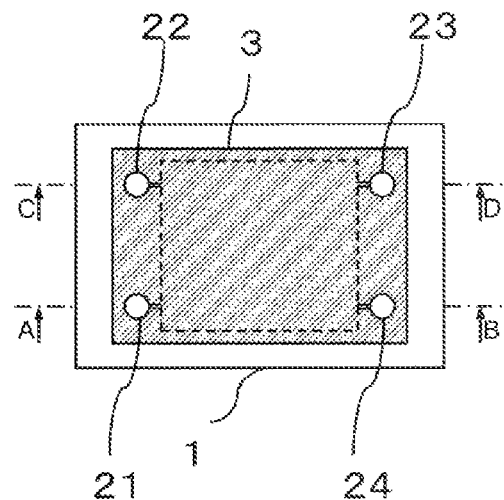
FIG. 9 is a top view showing the second embodiment of the hydrogen separation device. (The laminate in the vessel is shown through perspective projection for convenience sake.)
Figure 10:
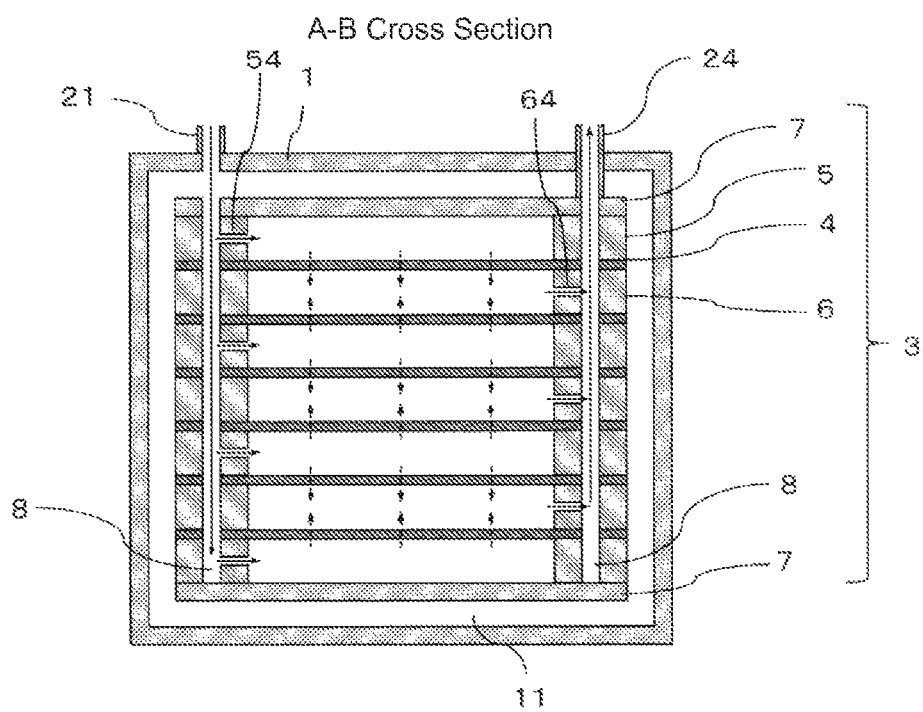
FIG. 10 is an A-B cross-sectional view of FIG. 9.

FIG. 9 is a top view of the above-mentioned hydrogen separation device, in which the A-B cross section is FIG. 10. The mixed gas introduced into the vessel through the mixed gas introduction pipe 21 fills the buffer space 11. The mixed gas is introduced into the mixed gas flow path 51 (and 54) inside the laminate 3. Specifically, the pressure in the buffer space 11 is the same as that in the mixed gas flow path 51 (or 54).

As a result, in the laminate 3, there is no space having a higher pressure than the pressure in the buffer space 11, and the laminate 3 is not given any force to expand and break it. As a result, the device secures excellent durability. In addition, since the buffer gas is the mixed gas to be supplied to the device, any other component than the introduced mixed gas does not mix in the system even though both surfaces of the transmitted gas layer 6 are insufficiently sealed or even though the laminate 3 is broken during use.

Sealing up the vessel 1 by welding enhances the reliability of the airtightness of the vessel. A hydrogen separation device not using a vessel is risky in that, when the laminate therein is broken, then not only air components would mix in the transmitted gas but also the hydrogen-containing mixed gas would leak out in air.

Figure 11:
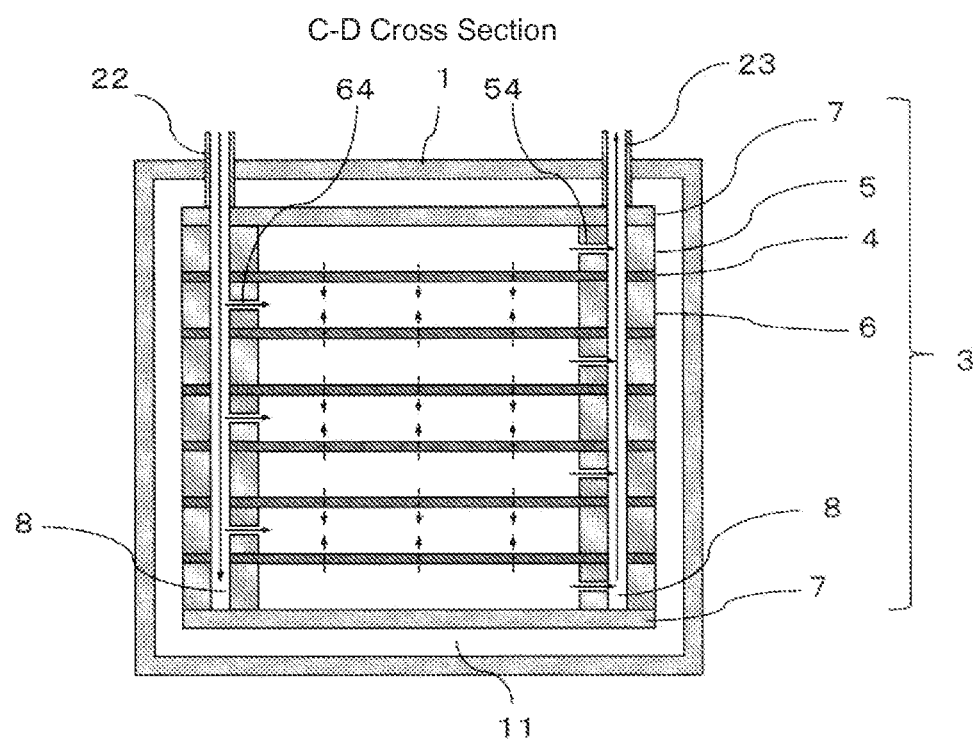
FIG. 11 is a C-D cross-sectional view of FIG. 9.

FIG. 11 is a C-D cross-sectional view of FIG. 9, and is the same as in the first embodiment. The configurations of the mixed gas layer 5, the transmitted gas layer 6 and the hydrogen separation layer 4 to be used here are also the same as in the first embodiment, and therefore the drawings thereof are omitted.

Figure 12:
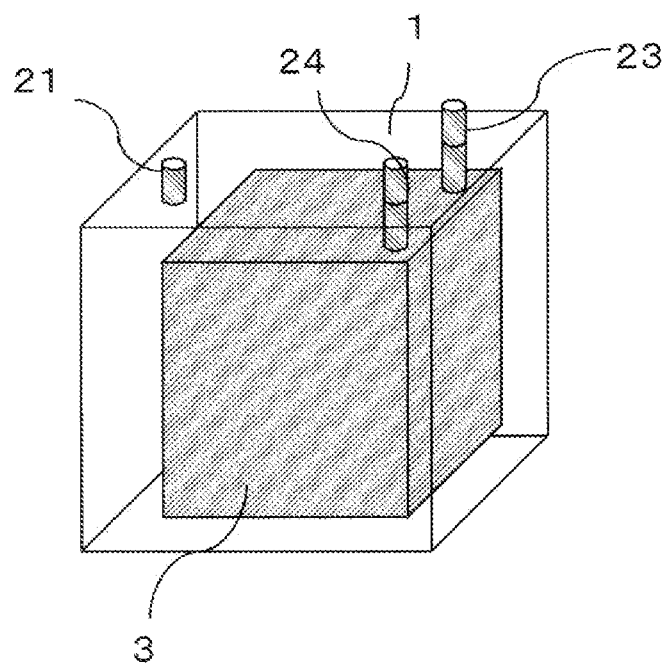
FIG. 12 is a perspective view showing the third embodiment of the hydrogen separation device. (The laminate and the pipe arrangement in the vessel are shown through perspective projection for convenience sake.)

FIG. 12 shows the third embodiment of the hydrogen separation device of the invention. The third embodiment does not have a pipe for sweep gas introduction, and therefore, as shown in the top view of FIG. 13, this embodiment does not have a pipe, interlayer communicating hole at a part of the left end of the laminate 3, and the others in this are the same as in the second embodiment. The third embodiment does not use a sweep gas, and high-purity hydrogen is obtained through the transmitted gas discharge pipe 24. For hydrogen permeation, a hydrogen pressure difference is necessary, and therefore the pressure of the mixed gas to be introduced into the system is higher than that of the transmitted gas.

Figure 13:
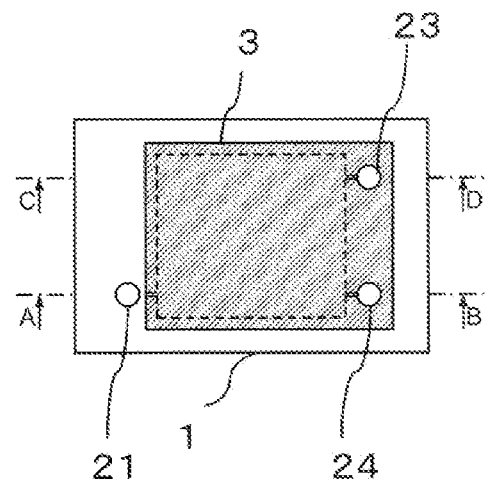
FIG. 13 is a top view showing the third embodiment of the hydrogen separation device. (The laminate in the vessel is shown through perspective projection for convenience sake.)
Figure 14:
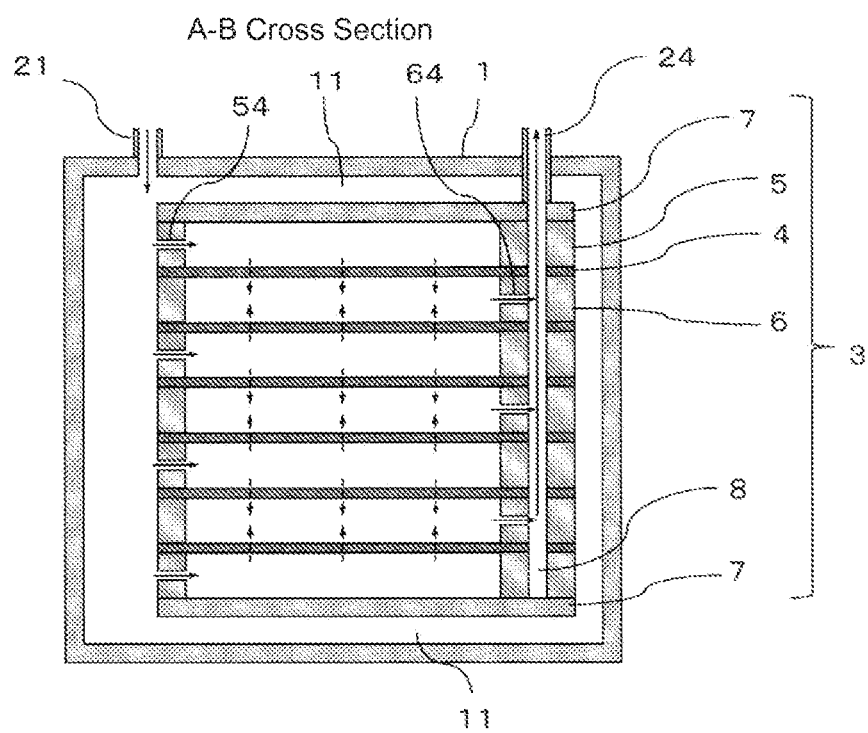
FIG. 14 is an A-B cross-sectional view of FIG. 13.

FIG. 14 shows the A-B cross section of FIG. 13. The mixed gas introduced into the vessel 1 through the mixed gas introduction pipe 21 fills the buffer space 11. The mixed gas is introduced into the hydrogen-permeable part-corresponding region 51 of the mixed gas flow path inside the laminate 3, via the intralayer connecting flow path 54. Specifically, the pressure in the buffer space 11 is the same as that in the mixed gas flow path 51 (or 54).

As a result, in the laminate 3, there is no space having a higher pressure than the pressure in the buffer space 11, and the laminate 3 is not given any force to expand and break it. As a result, the device secures excellent durability. In addition, since the buffer gas is the mixed gas to be supplied to the device, any other component than the introduced mixed gas does not mix in the system even though both surfaces of the transmitted gas layer 6 are insufficiently sealed or even though the laminate 3 is broken during use.

Sealing up the vessel 1 by welding enhances the reliability of the airtightness of the vessel. A hydrogen separation device not using a vessel is risky in that, when the laminate therein is broken, then not only air components would mix in the transmitted gas but also the hydrogen-containing mixed gas would leak out in air.

Figure 15:
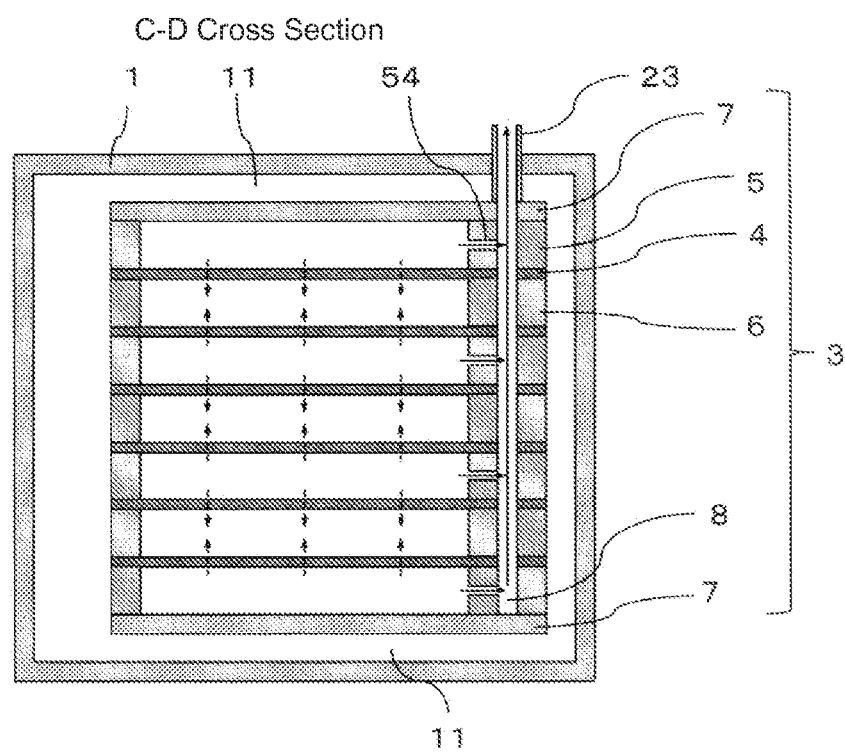
FIG. 15 is a C-D cross-sectional view of FIG. 13.
Figure 16:
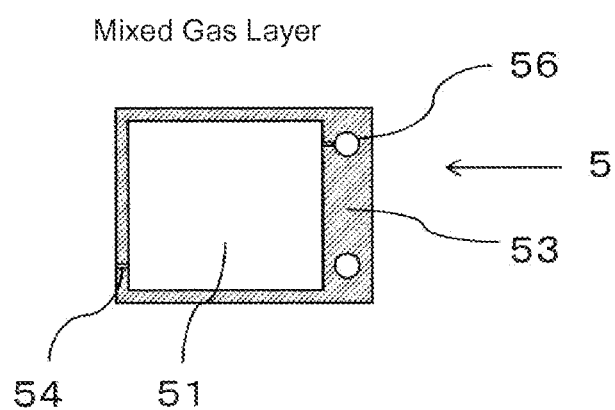
FIG. 16 is a plan view showing the mixed gas layer in the third embodiment.
Figure 17:
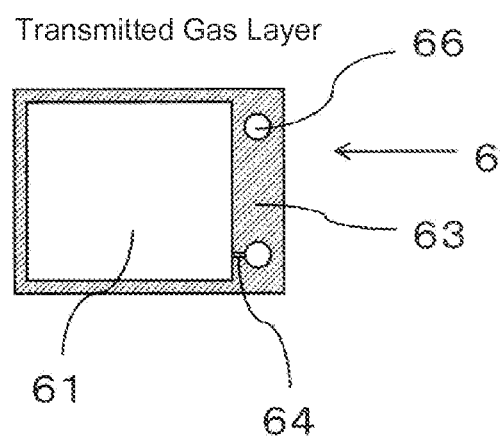
FIG. 17 is a plan view showing the transmitted gas layer in the third embodiment.
Figure 18:
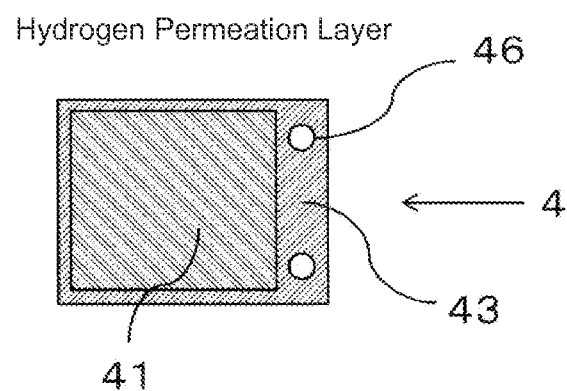
FIG. 18 is a plan view showing the hydrogen separation layer in the third embodiment.

FIG. 15 is a C-D cross-sectional view of FIG. 13. The configurations of the mixed gas layer 5, the transmitted gas layer 6 and the hydrogen separation layer 4 to be used here are shown in FIG. 16, FIG. 17 and FIG. 18, respectively. Different from the first and second embodiments, this embodiment does not have an intralayer connecting flow path for sweep gas introduction. As illustrated, the third embodiment has only two pipes 23 and 24 for connecting the flow path inside the laminate 3 and the outside area of the vessel 1, and the hydrogen separation device of this embodiment is easy to produce.

Figure 19:
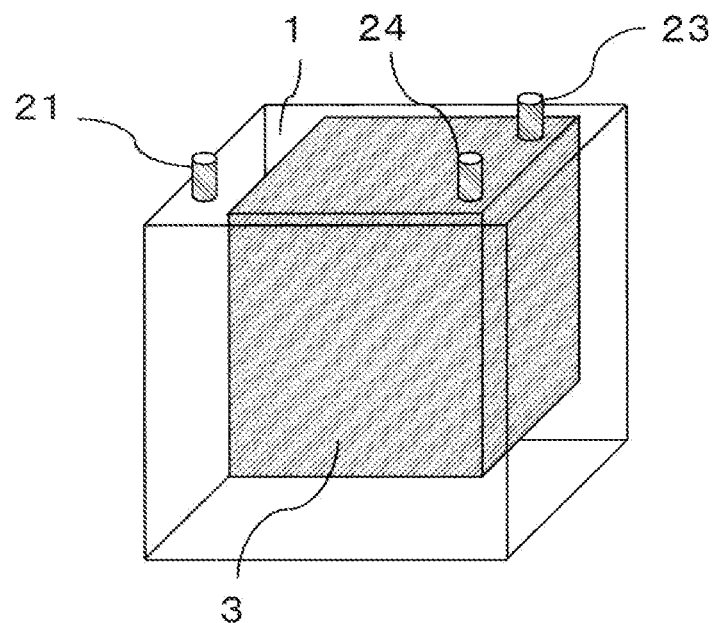
FIG. 19 is a perspective view showing the fourth embodiment of the hydrogen separation device. (The laminate in the vessel is shown through perspective projection for convenience sake.)
Figure 20:
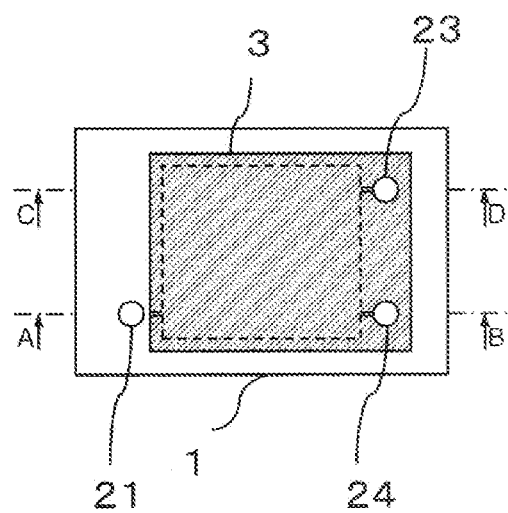
FIG. 20 is a top view showing the fourth embodiment of the hydrogen separation device. (The laminate in the vessel is shown through perspective projection for convenience sake.)
Figure 21:
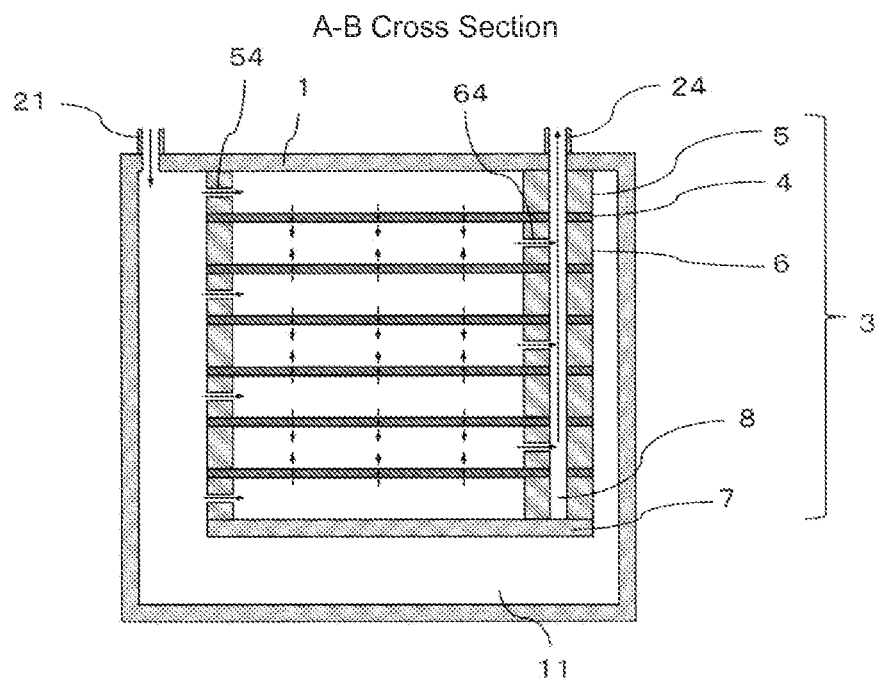
FIG. 21 is an A-B cross-sectional view of FIG. 20.

FIG. 19 shows the fourth embodiment of the hydrogen separation device of the invention. The top view of FIG. 19 is shown in FIG. 20; and the A-B cross section of FIG. 20 is shown in FIG. 21. This embodiment is the same as the third embodiment except that the top face of the laminate 3 is integrated with the vessel 1. Specifically, in this embodiment, there is provided a buffer space which a buffer gas can reach, only on one end face in the lamination direction of the laminate. Also in this case, the laminate 3 has therein no space having a higher pressure than that in the buffer space 11, and therefore any force to expand and break the laminate is not give thereto. As a result, the device secures excellent durability.

Since the buffer gas is the mixed gas to be supplied to the device, any other component than the introduced mixed gas does not mix in the system even when the sealing of both surfaces of the transmitted gas layer 6 is insufficient or even though the laminate 3 is broken during use. Further, sealing up the vessel 1 by welding enhances the reliability of the airtightness of the vessel. A hydrogen separation device not using a vessel is risky in that, when the laminate therein is broken, then not only air components would mix in the transmitted gas but also the hydrogen-containing mixed gas would leak out in air.

Using the vessel 1 as a part of the laminate 3 in the manner as above facilitates the operation of fixing the pipe for connecting the flow path in the laminate 3 and the outside area of the vessel 1, and in addition, enables producing the hydrogen separation device resistant to vibration.

Figure 22:
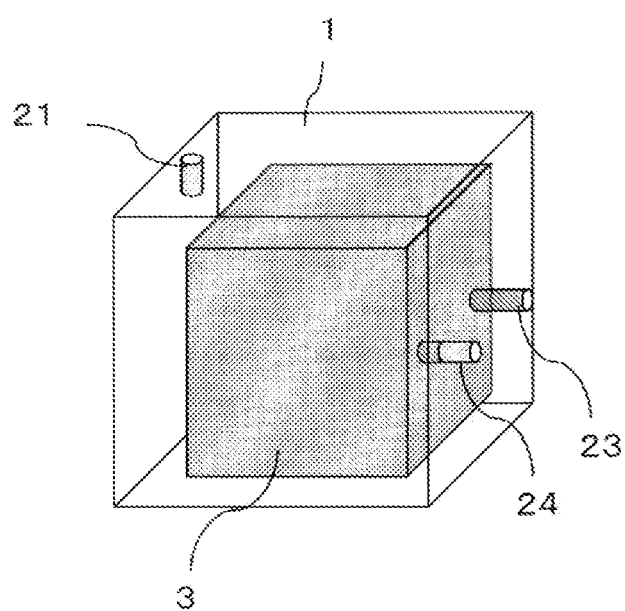
FIG. 22 is a perspective view showing the fifth embodiment of the hydrogen separation device. (The laminate and the pipe arrangement in the vessel are shown through perspective projection for convenience sake.)
Figure 23:
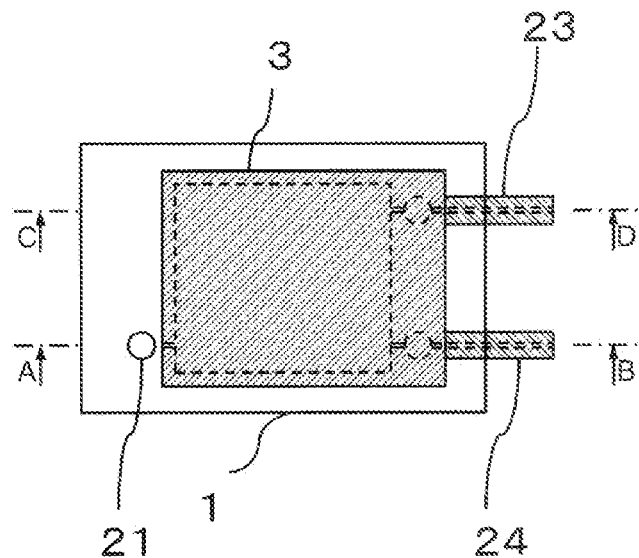
FIG. 23 is a top view showing the fifth embodiment of the hydrogen separation device. (The laminate and the pipe arrangement in the vessel are shown through perspective projection for convenience sake.)
Figure 24:
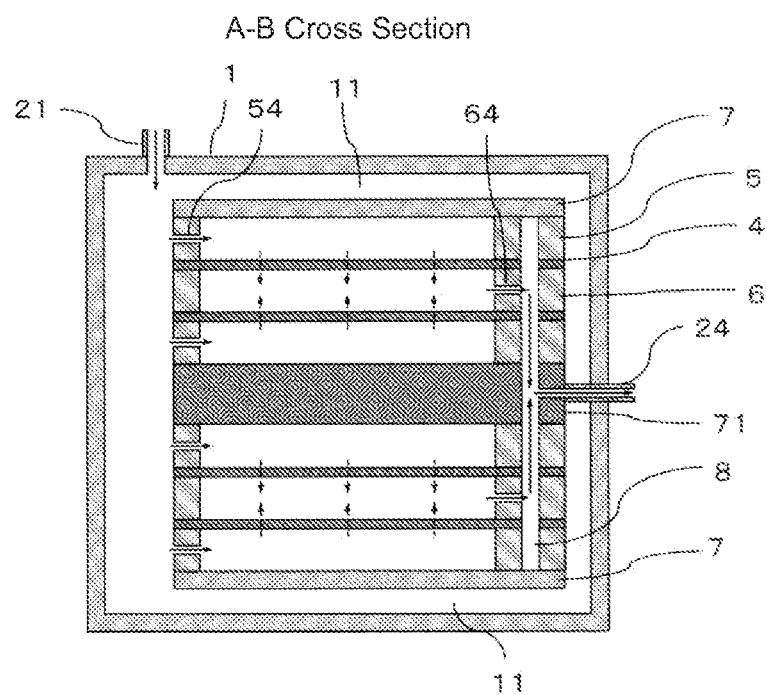
FIG. 24 is an A-B cross-sectional view of FIG. 23.
Figure 25:
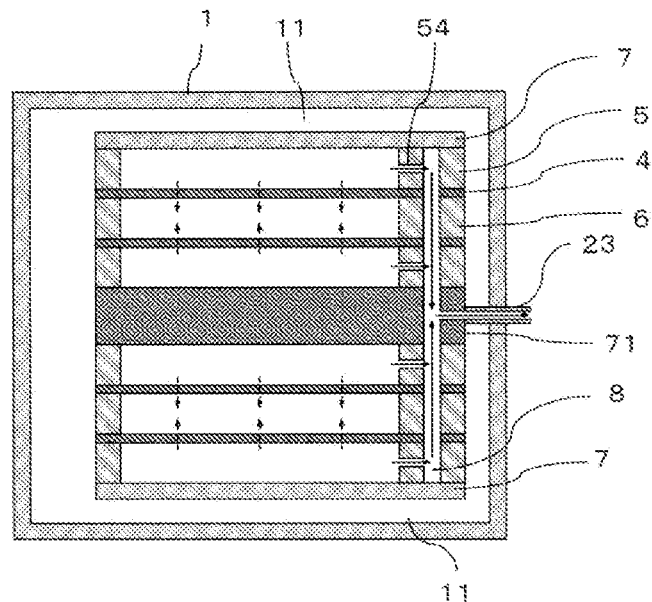
FIG. 25 is a C-D cross-sectional view of FIG. 23.

FIG. 22 shows the fifth embodiment of the hydrogen separation device of the invention. The top view of FIG. 22 is shown in FIG. 23; and the A-B cross section and the C-D cross section of FIG. 23 are in FIG. 24 and FIG. 25, respectively. This embodiment is the same as the third embodiment except that a part of the hydrogen separation layer and the transmitted gas layer are replaced with the pipe connection plate 71 and that the pipe 23 and 24 for introducing the gas in the laminate 3 toward the outside area of the vessel 1 are connected to the peripheral face of the pipe connection plate 71. Consequently, those embodiments attain quite the same function. Moreover, since the pipes 23 and 24 are connected to the surface that is vertical to the end face in the lamination direction of the laminate and since both ends in the lamination direction of the laminate 3 are flat, it is easier to apply pressure to both sides for diffusion bonding and the production cost can be thereby reduced.

Figure 26:
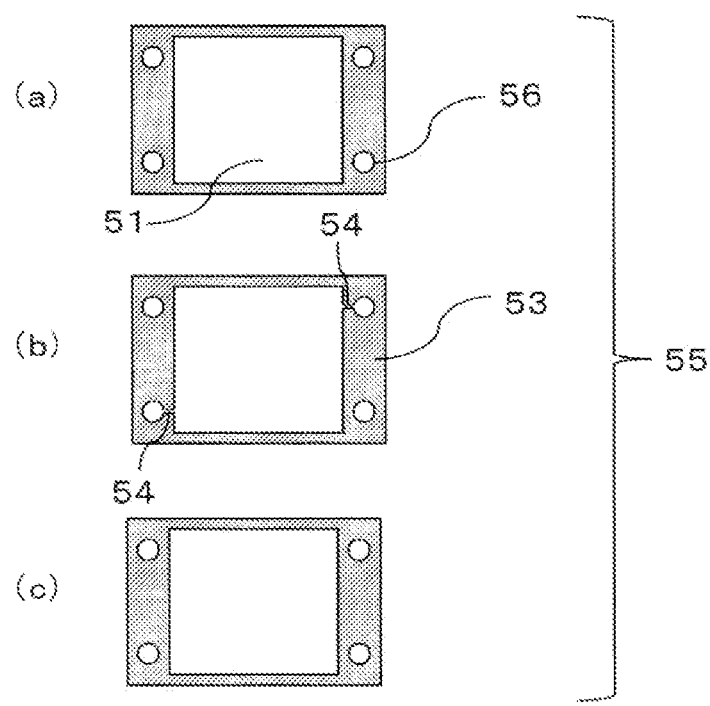
FIG. 26 is a plan view showing the constitutive member (tabular member) of the mixed gas layer.

FIG. 26 shows a tabula member 55 serving as a constitutive member of the mixed gas layer 5. It is difficult to form, in the seal part 53, the intralayer connecting flow path 54 not exposed out on both surfaces of the seal part by the sue of one member of the mixed gas layer 5; however, as in FIG. 26, when the intralayer connecting flow path member (b) having the intralayer connecting flow path 54 therein is laminated with the intralayer path members (a) and (c) not having the intralayer connecting flow path 54 therein, on both surfaces of the member (b), then the mixed gas layer 5 of FIG. 5 can be readily constructed. The transmitted gas layer 6 of FIG. 6 can also be produced by laminating the same tabular members and turning back the laminate. It is possible to mass-produce a large number of these tabular members 55 by etching.

Figure 27:
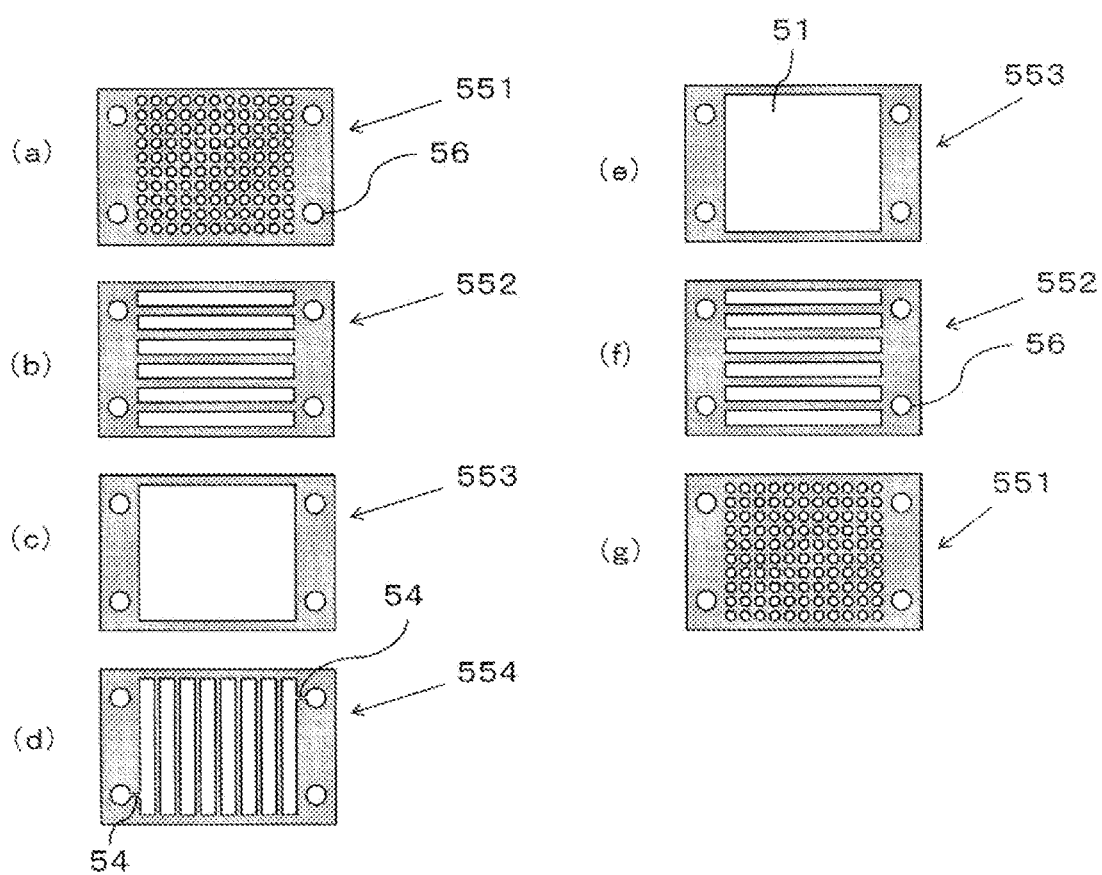
FIG. 27 is a plan view showing other examples of the constitutive member (tabular member) of the mixed gas layer.

FIG. 27 shows other examples of the tabular member 55 serving as the constitutive member of the mixed gas layer 5. In this case, the mixed gas flow path 51 is composed by laminating those seven members (a) to (g) in that order. Specifically, the configuration of the case is composed of the hydrogen separation layer-supporting and sealing member 551 of (a) and (g) formed of a soft material having fine through-holes in the hydrogen-permeable part-corresponding region 51 and suitable for sealing; the hydrogen separation layer-supporting intralayer flow path member 552 of (b) and (f) formed of a high-strength material in which the hydrogen-permeable part-corresponding region 51 is divided into multiple portions; the supporting members-sealing member 553 of (c) and (e) for sealing between the hydrogen separation layer-supporting intralayer flow path member 552 and the hydrogen separation layer-supporting intralayer connection path member 554; and the hydrogen separation layer-supporting intralayer connection path member 554 of (d) formed of a high-strength material, which has the intralayer connection path 54 in the seal part 53 and in which the hydrogen-permeable part-corresponding region 51 is divided in a pattern different from the above (b) and (f) so that the divided intralayer connecting flow paths do not planarly communicate with each other. By combining the tabular members 551 to 554 having different structures (a) to (g), the mixed gas layer 5 can be constructed. The transmitted gas layer 6 can also be produced by laminating the same tabular members 551 to 554 of (a) to (g) and turning back the laminate.

Using the mixed gas layer 5 and the transmitted gas layer 6 thus produced in the manner as above provides a hydrogen separation device having a large effective film area per one hydrogen separation layer therein and resistant to a large pressure difference. Here, the divided portions of the hydrogen separation layer-supporting intralayer flow path member 552 and the hydrogen separation layer-supporting intralayer connection path member 554 are vertical to each other, in which, however, the lamination direction of the vertically-crossing parts keeps an empty space in the supporting members-sealing member 553, and the configuration of the type has a marginal space by the thickness of the sealing member. As a result, when the laminate is integrated, no pressure is given in the lamination direction and the hydrogen separation layer 4 and the hydrogen separation layer-supporting sealing member 551 are not kept in airtight contact with each other therebetween. Specifically, the two are not bonded and are not restrained from each other. In that manner, the laminate can be readily integrated with no damage to the hydrogen separation layer 4.

EXAMPLES

The invention is described more concretely with reference to the following Examples; however, the invention is not restricted at all by these Examples. Needless-to-say, the invention may be changed and modified in any desired manner not overstepping the scope and the spirit thereof.

Example 1

Figure 28:
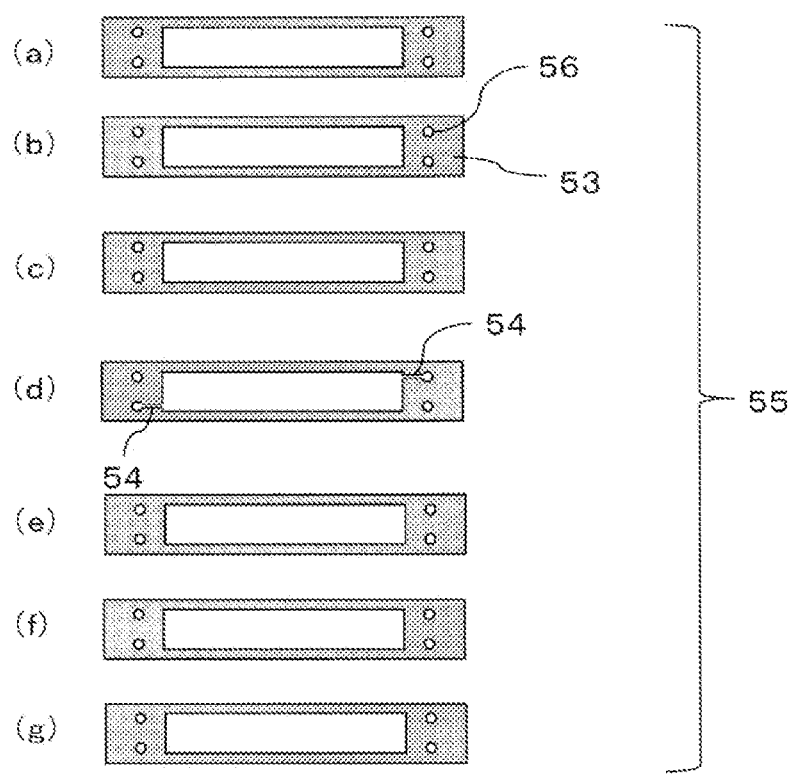
FIG. 28 is a plan view showing the constitutive members (tabular members) of the mixed gas layer used in Example

One pure-Pd film having a thickness of 200 μm was used for the hydrogen separation layer. The film was sandwiched between the mixed gas layer produced by laminating the tabular members 55 of (a) to (g) shown in FIG. 28 in that order and the transmitted gas layer produced by turning back the mixed gas layer, and laminated.

The in-plane direction width of the intralayer connecting flow path 54 formed of the tabular member (d) is 0.6 mm; and the effective film area for hydrogen permeation is 2.4 $cm^2$. SUS430 having a thickness of 0.5 mm was used for the tabular members 55 of the intralayer flow path members (b) and (f) and the tabular member 55 of the intralayer connecting flow path member (d); and Ni having a thickness of 0.2 mm was used for the tabular members 55 of the sealing members (a), (c), (e) and (g).

Thus laminated, the hydrogen separation layer, the mixed gas layer and the transmitted gas layer were sandwiched between end plates with pipe arrangement of SUS430 having a thickness of 20 mm, and using a jig, these were clamped with 6 bolts each having a diameter of 8 mm, from both sides at a torque of 32 Nm. This was heat-treated in an atmosphere of 95% Ar-5% $H_2$ at 700° C. for 1 hour for diffusion bonding to give an integrated laminate.

The laminate was set in a vessel in such a manner that a buffer space could be formed at both end faces thereof in the lamination direction, and a mixed gas introduction pipe, a sweep gas introduction pipe and a transmitted gas discharge pipe were connected between the flow paths inside the laminate and the outside area of the vessel. The mixed gas not having passed through the hydrogen separation layer was led outside the vessel via the buffer space inside the vessel.

After the device was heated up to 300° C., pure hydrogen was introduced into the mixed gas flow path under 900 kPa (absolute pressure) for 75 hours and 30 minutes. During this, the pressure in the transmitted gas flow path was 120 kPa. At this time, 10 mL (volume at room temperature under normal pressure)/min hydrogen passed through the system and was taken out via the transmitted gas discharge pipe. Subsequently, a mixed gas (73.4% $H_2$, 23.8% $CO_2$, 2.8% CO) was introduced into the mixed gas flow path in place of pure hydrogen thereinto, and 6 mL/min hydrogen was obtained through the transmitted gas discharge pipe.

The component was analyzed through gas chromatography, in which, however, no impurity was detected. It is known that pure hydrogen having a purity of at least 99.99% was obtained. This was cooled down to 250° C. as such, and the system was checked for a total of 76 hours and 40 minutes from hydrogen introduction into the mixed gas flow path. 4 mL/min hydrogen was obtained through the transmitted gas discharge pipe, or that is, even though the flow rate of hydrogen obtained reduced since the driving temperature was lowered, no impurity was detected in the discharged gas. This confirms that high-purity hydrogen can be obtained for a long period of time with no disruption of the laminate.

Comparative Example 1

The same layered configuration as in Example 1 was constructed, and integrated through diffusion bonding under the same condition to give a laminate. The laminate was set in a vessel in such a manner that a buffer space could be formed at both end faces thereof in the lamination direction, and a mixed gas introduction pipe, a sweep gas introduction pipe, a transmitted gas discharge pipe and a mixed gas discharge pipe were all connected between the flow paths inside the laminate and the outside area of the vessel. For safety, the vessel was sealed up but was filled with air at atmospheric pressure. The pressure inside the vessel was about 200 kPa at a driving temperature of 300° C.

After the device was heated up to 300° C., Ar was introduced into the mixed gas flow path at 900 kPa while Ar under atmospheric pressure was into the transmitted gas flow path, and the device was left as such for 6 hours and 40 minutes. Subsequently, a mixed gas (73.4% $H_2$, 23.8% $CO_2$, 2.8% CO) was introduced into the mixed gas flow path at 900 kPa, and the transmitted gas flow path was kept at 180 kPa.

In 4 hours after the mixed gas introduction, impurities such as $CO_2$ and others were detected in the hydrogen obtained through the transmitted gas discharge pipe, and the laminate was broken. The device was disassembled and checked, and there occurred a leak at the bonded part of the end plate.

In this experiment, the pressure around the laminate was about 200 kPa, and the laminate had a space having a higher pressure of 900 kPa. Consequently, the laminate was given a force to expand it and would be therefore broken. This result was compared with the result in Example 1, which clarified that it is effective to communicate the mixed gas flow path and the buffer space with each other for improving the structure stability of the laminate.

Example 2

Figure 29:
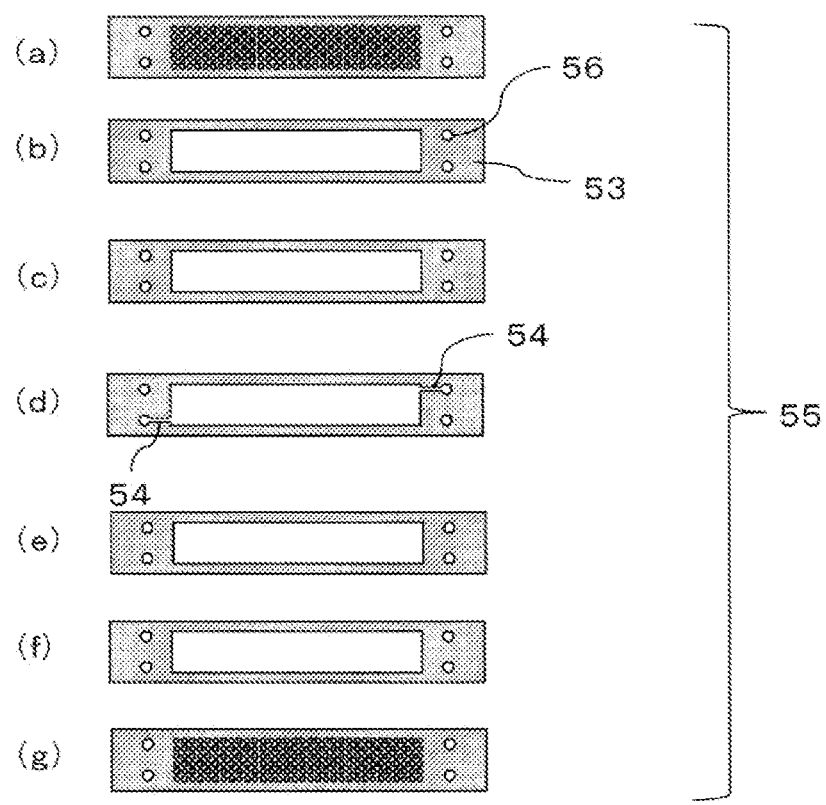
FIG. 29 is a plan view showing the constitutive members (tabular members) of the mixed gas layer of another Example.

Four $Pd_{75}Ag_{25}$ films (the subscripts indicate atomic %) each having a thickness of 20 μm were used for the hydrogen separation layer. The films were sandwiched between the mixed gas layer produced by laminating the tabular members 55 of (a) to (g) shown in FIG. 29 in that order and the transmitted gas layer produced by turning back the mixed gas layer, and laminated. The tabular members 55 of (b) to (f) were the same as in FIG. 28; and for the tabular members 55 of the hydrogen separation layer-supporting sealing members (a) and (g), used was Ni having a thickness of 0.3 mm and having a large number of fine through-holes each having a diameter of 0.35 mm in the hydrogen-permeable part-corresponding region.

Thus laminated, the hydrogen separation layer, the mixed gas layer and the transmitted gas layer were sandwiched between end plates with pipe arrangement of SUS430 having a thickness of 20 mm, and using a jig, these were clamped with 6 bolts each having a diameter of 8 mm, from both sides at a torque of 32 Nm. This was heat-treated in an atmosphere of 95% Ar-5% $H_2$ at 700° C. for 1 hour for diffusion bonding to give an integrated laminate. The effective film area for hydrogen permeation is 9.6 $cm^2$ (2.4 $cm^2$ per one hydrogen separation layer).

The laminate was set in a vessel in such a manner that a buffer space could be formed at both end faces thereof in the lamination direction, and a sweep gas introduction pipe, a transmitted a transmitted gas discharge pipe and a mixed gas discharge pipe were connected between the flow paths inside the laminate and the outside area of the vessel. The mixed gas was led to the mixed gas flow path inside the laminate via the buffer space in the vessel.

After the device was heated up to 300° C., a mixed gas (73.4% $H_2$, 23.8% $CO_2$, 2.8% CO) was introduced into the mixed gas flow path at 900 kPa. During this, the pressure in the transmitted gas flow path was atmospheric pressure (100 kPa). After 40 hours, 53 mL/min hydrogen was obtained through the transmitted gas discharge pipe. The component was analyzed through gas chromatography, in which, however, no impurity was detected. It is known that pure hydrogen having a purity of at least 99.99% was obtained. This confirms that, even in the case where four thin hydrogen separation layers each having a thickness of 20 μm were used in constructing the laminate, high-purity hydrogen can be obtained for a long period of time with no disruption of the laminate.

Example 3

Eight $Pd_{75}Ag_{25}$ films each having a thickness of 20 μm were used for the hydrogen separation layer. The films were sandwiched between the mixed gas layer produced by laminating the seven members (a) to (g) shown in FIG. 27 in that order and the transmitted gas layer produced by turning back the mixed gas layer, and laminated. The width in the in-plane direction of the intralayer connecting flow path 54 formed in (d) of the hydrogen separation layer-supporting intralayer connecting flow path member 554 was 0.6 mm.

For the (b) and (f) of the hydrogen separation layer-supporting intralayer flow path member 552 and for (d) of the hydrogen separation layer-supporting intralayer connecting flow path member 554, used was SUS430 having a thickness of 0.5 mm; for (c) and (e) of the supporting members-sealing member 553, used was Ni having a thickness of 0.2 mm; and for (a) and (g) of the hydrogen separation layer-supporting sealing member 551, used was Ni having a thickness of 0.3 mm and having a large number of fine through-holes each having a diameter of 0.35 mm in the hydrogen-permeable part-corresponding region. SUS430 having a thickness of 10 mm was used for the end plate with pipe arrangement, which was so designed that the pipes connecting the flow paths inside the laminate and the outside area of the vessel could be connected to the surface vertical to the end face in the lamination direction of the laminate.

Thus laminated, the hydrogen separation layer, the mixed gas layer and the transmitted gas layer were sandwiched between end plates with pipe arrangement of SUS430 having a thickness of 5 mm, and using a jig, these were clamped with 6 bolts each having a diameter of 10 mm, from both sides at a torque of 65 Nm. This was heat-treated in an atmosphere of 95% Ar-5% $H_2$ at 700° C. for 5 hours for diffusion bonding to give an integrated laminate.

The effective film area for hydrogen permeation is 81 $cm^2$ (10.1 $cm^2$ per one hydrogen separation layer). The laminate was set in a vessel in such a manner that a buffer space could be formed at both end faces thereof in the lamination direction. On this occasion, the mixed gas introduction pipe was directly connected to the vessel wall so as to communicate with the buffer space, and a through-hole to communicate with the mixed gas flow path was formed in the end plate. Specifically, the mixed gas introduced into the system reaches the mixed gas flow path via the mixed gas introduction pipe, the buffer space and the through-hole. On the other hand, the mixed gas discharge pipe and the transmitted gas discharge pipe connected to the laminate continue to the outside area of the vessel. The size of the hydrogen separation device thus constructed as above was 96 $cm^3$ (width 64 mm×height 44 mm×depth 34 mm) excepting the pipes outside the device.

Figure 30:
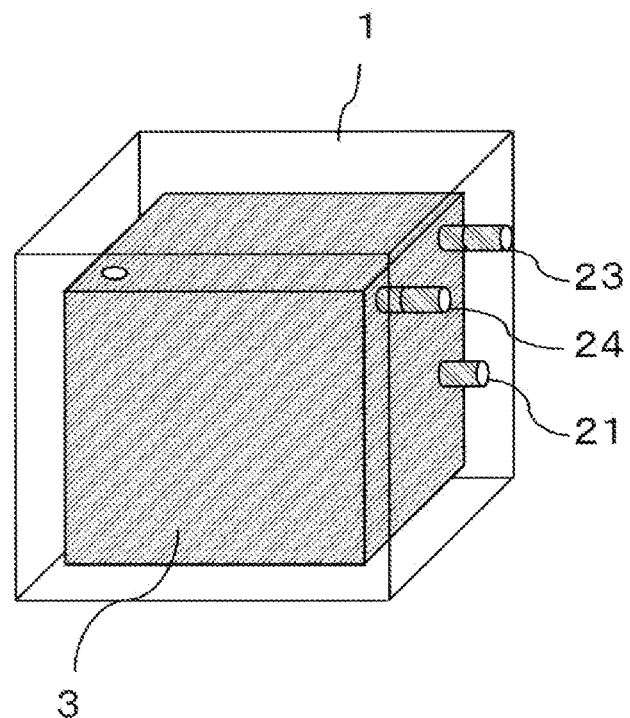
FIG. 30 is a perspective view showing the hydrogen separation device of Example 3. (The laminate and the pipe arrangement in the vessel are shown through perspective projection for convenience sake.)
Figure 31:
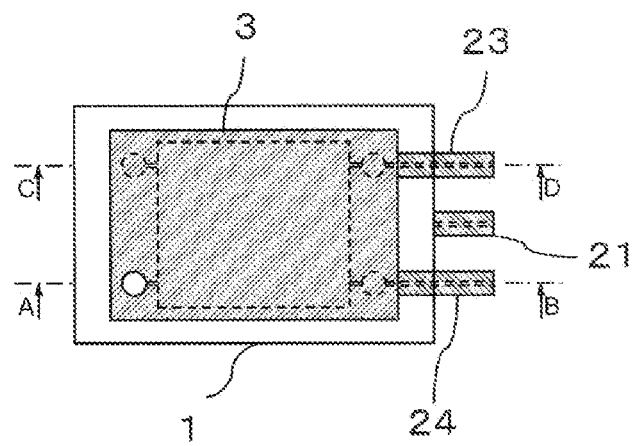
FIG. 31 is a top view showing the hydrogen separation device of Example 3. (The laminate in the vessel is shown through perspective projection for convenience sake.)
Figure 32:
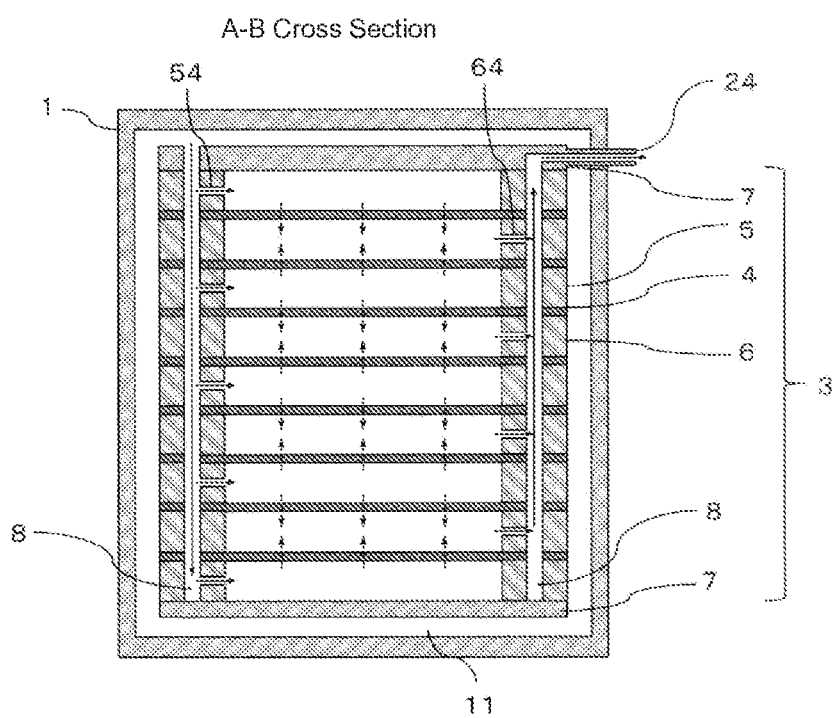
FIG. 32 is an A-B cross-sectional view of FIG. 31.
Figure 33:
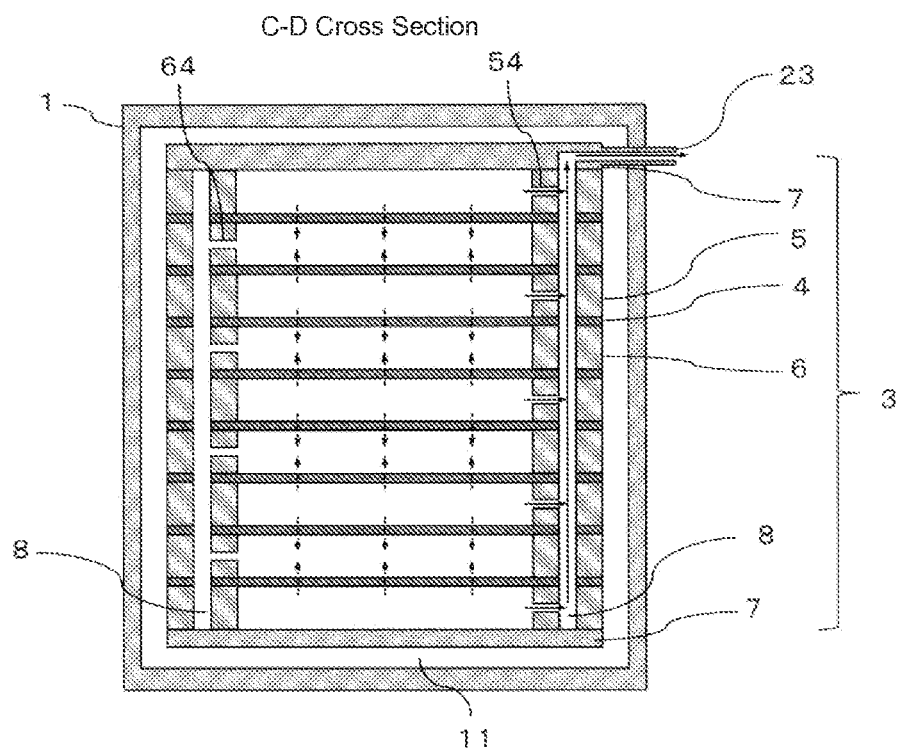
FIG. 33 is a C-D cross-sectional view of FIG. 31.

A perspective view of the hydrogen separation device used in Example 3 is shown in FIG. 30; the top view is in FIG. 31; and the A-B cross section and the C-D cross section of FIG. 31 are in FIG. 32 and FIG. 33, respectively. The configuration of the hydrogen separation device is similar to that of the fifth embodiment in that the device does not have a sweep gas introduction pipe and that the pipes are connected to the surface vertical to the end face in the lamination direction.

Figure 34:
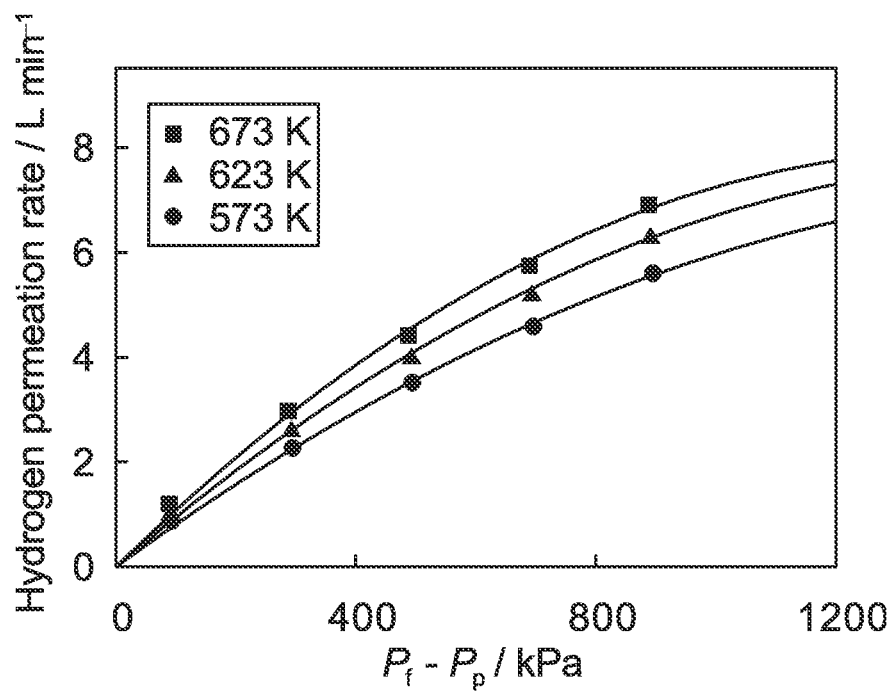
FIG. 34 is a graph showing the relationship between the difference between the pressure (Pf) in the mixed gas flow path and the pressure (Pp) in the transmitted gas flow path, and the amount of the hydrogen flow obtained from the transmitted gas discharge pipe at that time.

After the device was heated up to 350° C., pure hydrogen was introduced into the mixed gas flow path under 1000 kPa (absolute pressure). During this, the pressure in the transmitted gas flow path was atmospheric pressure (100 kPa). FIG. 34 shows the relationship between the difference between the pressure (Pf) in the mixed gas flow path and the pressure (Pp) in the transmitted gas flow path, and the amount of the hydrogen flow obtained from the transmitted gas discharge pipe at that time.

At 350° C. (623 K) with a pressure difference of 900 kPa, 6.4 L (volume at room temperature under normal pressure)/min hydrogen was obtained through the transmitted gas discharge pipe. Similarly, at a driving temperature 300° C. (573 K), 5.7 L (volume at room temperature under normal pressure)/min hydrogen was obtained through the transmitted gas discharge pipe; and at a driving temperature 400° C. (673 K), 6.9 L (volume at room temperature under normal pressure)/min hydrogen was obtained therethrough.

Figure 35:
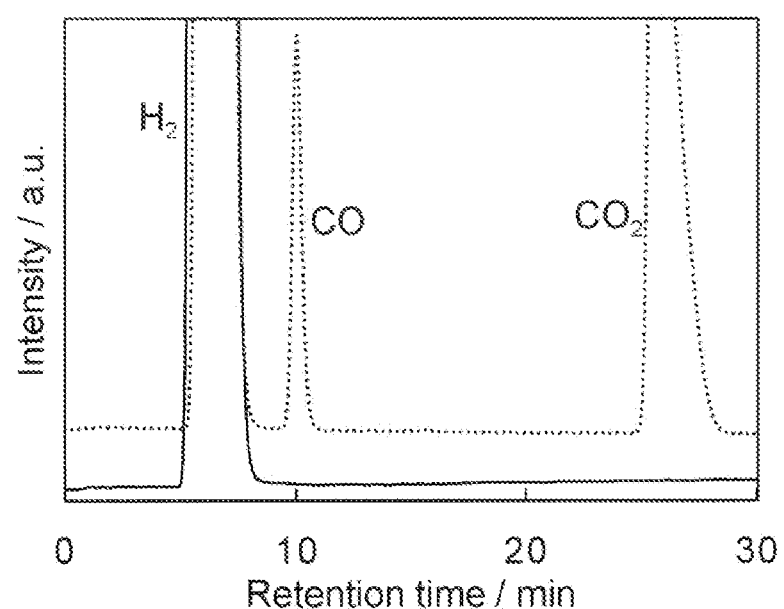
FIG. 35 is a graph showing the gas chromatography results of the gas obtained from the mixed gas discharge pipe (dotted line) and that from the transmitted gas discharge pipe (solid line) in the case where a mixed gas was introduced in the mixed gas flow path after the pressure in the mixed gas flow path was increased/decreased at 800 kPa/min.

Further, pure hydrogen was introduced into the mixed gas flow path at 200 kPa, and at a rate of 800 kPa/min, the device was pressurized up to 1000 kPa, and then at the same rate, the device was depressurized down to 200 kPa. During this, the pressure in the transmitted gas flow path was atmospheric pressure (100 kPa). After the depressurization, a mixed gas (73.4% $H_2$, 23.8% $CO_2$, 2.8% CO) was introduced at 300 kPa in place of pure hydrogen. After 30 minutes, the gas collected through the mixed gas discharge pipe and through the transmitted gas discharge pipe was analyzed through gas chromatography, and the results are shown in FIG. 35.

$CO_2$ and CO not having passed through the hydrogen separation layer were detected from the mixed gas discharge pipe; however, only hydrogen was detected from the transmitted gas discharge pipe. It was confirmed that pure hydrogen having a purity of at least 99.99% was obtained. From this, it was confirmed that the laminate did not break even in rapid pressure elevation and pressure reduction and high-purity hydrogen was obtained through the device.

Figure 36:
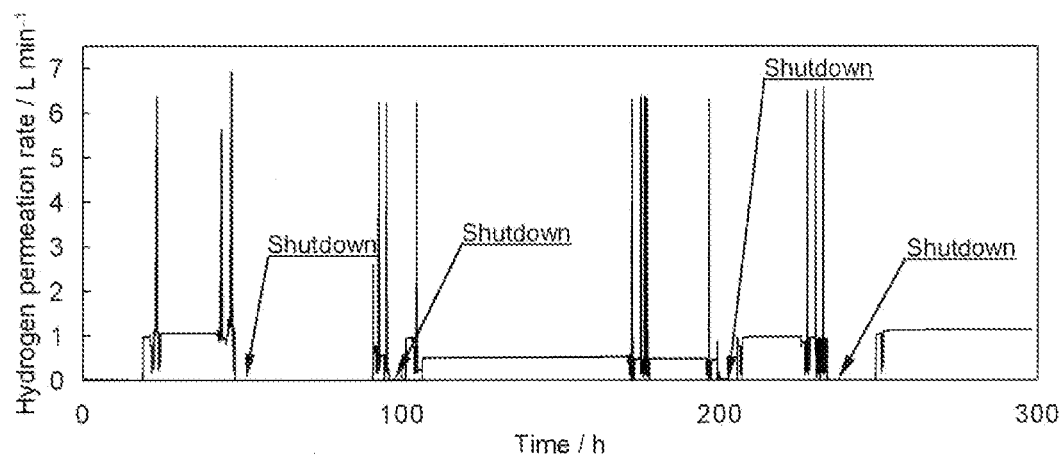
FIG. 36 is a graph showing the relationship between the operating time and the amount of the hydrogen flow obtained from the transmitted gas discharge pipe.

FIG. 36 shows the relationship between the operating time and the amount of the hydrogen flow obtained from the transmitted gas discharge pipe in the experiment. During this, shutdown and restarting of the hydrogen separation device was carried out four times in total. In shutdown, the transmitted gas discharge pipe was made to communicate with the pipe through which Ar runs so that pure Ar was kept introduced into the mixed gas flow path at a flow rate of 0.2 L/min and under atmospheric pressure (100 kPa), whereby the device was cooled down to room temperature. After the time shown in FIG. 36, the test was continued and the hydrogen permeation test run for 467 hours in total, and thereafter a mixed gas (73.4% $H_2$, 23.8% $CO_2$, 2.8% CO) was introduced into the mixed gas flow path at 350° C. and at 300 kPa. During this, the pressure in the transmitted gas flow path was atmospheric pressure (100 kPa).

After 30 minutes, hydrogen obtained from the transmitted gas discharge pipe was analyzed through gas chromatography, but no impurity was detected therein. It was confirmed that pure hydrogen having a purity of at least 99.99% was obtained. From the above, it was confirmed that the device can maintain the hydrogen separation performance thereof with no damage even after repeated shutdown and restarting, and in addition, can maintain the hydrogen separation performance thereof with no damage for a long period of time.

Further, Ar was introduced into the mixed gas flow path and into the transmitted gas flow path of this device at 950 kPa, and the device was immersed under water, whereupon no bubble was observed in the surface of the hydrogen separation device, from which it was confirmed that the device maintained the airtightness thereof inside and outside the device. The above results verify that even when the number of the hydrogen separation layers having a broader area than in Example 2 was increased up to 8, the device can still realize the excellent function.

Comparative Example 2

Using 6 hydrogen separation layers, a hydrogens separation device having the same configuration as in Example 3 was constructed. In this case, 8 through-holes for bolts were formed in the periphery of the end plate, and using 8 bolts each having a diameter of 10 mm, the device was constructed. For forming the through-holes for bolts in this case, used were large end plates for the mixed gas layer, the transmitted gas layer and the hydrogen separation layer. The size of the hydrogen separation device thus constructed here was 640 $cm^3$ (width 100 mm×height 80 mm×depth 80 mm) excepting the pipes outside the device and was more than five times that in Example 3.

The bolts were clamped up at a torque of 80 Nm, and then Ar was introduced into the mixed gas flow path and the transmitted gas flow path at 950 kPa, and the device was immersed under water. A large number of bubbles formed on the surface of the laminate of the hydrogen separation device, from which it was known that the airtightness of the device was insufficient.

Subsequently, the bolts were further clamped up to a torque of 100 Nm, then Ar was introduced into the mixed gas flow path and the transmitted gas flow path at 950 kPa, and the device was immersed under water. Though the number of the bubbles formed on the surface of the laminate of the hydrogen separation device reduced, the number of the bubbles was still large, from which it was known that the airtightness inside and outside the device was still insufficient. The airtightness inside and outside the device was insufficient, and therefore for safety, the device was not tested in the hydrogen permeation test.

The results in Comparative Example 2 were compared with the results in Example 3, from which it was clarified that the hydrogen separation device could be rather down-sized by enveloping the laminate in the vessel but not by mere clamping with bolts as usual, and could more readily secure the airtightness.

INDUSTRIAL APPLICABILITY

The hydrogen separation device of the invention is excellent in durability and performance and, in addition, can be down-sized, and its production cost can be thereby reduced. Therefore, the device can be effectively used as a hydrogen separation device for use in various fields that require hydrogen, for example, in fuel cell systems such as industrial-use fuel cells, household-use fuel cells, fuel cell automobiles and others, and in chemical plants, etc.

REFERENCE SIGNS LIST

1: Vessel
11: Buffer Space
2: Pipe
21: Mixed Gas Introduction Pipe
22: Sweep Gas Introduction Pipe
23: Mixed Gas Discharge Pipe
24: Transmitted Gas Discharge Pipe
25: Buffer Gas Introduction Pipe
3: Laminate
4: Hydrogen Separation Layer
41: Hydrogen Permeable Part
43: Seal Part
46: Through-Hole (interlayer communicating through-hole)
5: Mixed Gas Layer
51: Mixed Gas Flow Path Hydrogen-Permeable Part-Corresponding Region
52: Seal Part
54: Mixed Gas Flow Path Intralayer Connecting Flow Path
55: Constitutive Member (tabular member)
551: Hydrogen Separation Layer-Supporting Sealing Member
552: Hydrogen Separation Layer-Supporting Intralayer Flow Path Member
553: Supporting Members-Sealing Member
554: Hydrogen Separation Layer-Supporting Intralayer Connecting Flow Path Member
56: Through-Hole (interlayer communicating through-hole)
6: Transmitted Gas Layer
61: Transmitted Gas Flow Path Hydrogen-Permeable Part-Corresponding Region
63: Seal Part
64: Transmitted Gas Flow Path Intralayer Connecting Flow Path
66: Through-Hole (interlayer communicating through-hole)
7: End Plate
71: Pipe Connection Plate
8: Interlayer Communicating Hole

The invention claimed is:

1. A hydrogen separation device comprising:
a laminate formed by laminating and integrating (i) a hydrogen separation layer having a hydrogen-permeable part for selectively transmitting hydrogen, (ii) a mixed gas layer kept adjacent to one surface of the hydrogen separation layer and having a mixed gas flow path in a hydrogen-permeable part-corresponding region where a hydrogen-containing gas runs and a seal part to surround the entire periphery of the mixed gas flow path exposed on the surface to be in airtight contact with the hydrogen separation layer, and (iii) a transmitted gas layer kept adjacent to the other surface of the hydrogen separation layer and having a transmitted gas flow path in a hydrogen-permeable part-corresponding region where hydrogen having passed through the hydrogen separation layer runs and a seal part to surround the entire periphery of the transmitted gas flow path exposed on the surface to be in airtight contact with the hydrogen separation layer, and
a vessel containing the laminate therein and filled with a buffer gas:
wherein a buffer space is provided between the laminate and an inner wall of the vessel in which a buffer gas can reach at least one end face of the laminate in the lamination direction,
the pressure in the buffer space is equal to or higher than the higher one of the pressure in the mixed gas flow path and the pressure in the transmitted gas flow path,
a seal part of the hydrogen separation layer, the seal part of the mixed gas layer, and the seal part of the transmitted gas layer are disposed so as to surround the entire periphery of each of the hydrogen separation layer, the mixed gas layer, and the transmitted gas layer, and
the seal part of the mixed gas layer and the seal part of the transmitted gas layer are flat for sealing.

2. The hydrogen separation device according to claim 1, wherein either one of the mixed gas flow path and the transmitted gas flow path having a higher pressure communicates with the buffer space.

3. The hydrogen separation device according to claim 1, wherein the mixed gas flow path communicates with the buffer space.

4. The hydrogen separation device according to claim 1, wherein the hydrogen-containing gas runs through the mixed gas flow path via the buffer space.

5. The hydrogen separation device according to claim 1, wherein two pipes link to the laminate to connect respectively the mixed gas flow path and the transmitted gas flow path the flow path inside the laminate and the outside area of the vessel.

6. The hydrogen separation device according to claim 1, wherein pipes connecting the mixed gas flow path or the transmitted gas flow path inside the laminate and the outside area of the vessel are linked to the surface that is vertical to the end face in the lamination direction of the laminate.

7. The hydrogen separation device according to claim 6, wherein the laminate contains a plate for pipe communication having a larger thickness than the thickness of the mixed gas layer or the thickness of the transmitted gas layer, and the pipes connecting the mixed gas flow path or the transmitted gas flow path inside the laminate and the outside area of the vessel are linked to the peripheral surface around the pipe communication plate.

8. The hydrogen separation device according to claim 1, which has, as provided in the seal part of the mixed gas layer and the transmitted gas layer kept in airtight contact with the hydrogen separation layer, an intralayer connecting flow path that communicates with the hydrogen-permeable part-corresponding region of the mixed gas layer or the transmitted gas layer for gas introduction or emission into or from the hydrogen-permeable part-corresponding region, and in which the intralayer connecting flow path has a part having a width in the in-layer direction of at most 1 mm.

9. The hydrogen separation device according to claim 8, wherein at least one of the mixed gas layer and the transmitted gas layer is composed of multiple tabular members, at least one tabular member constituting the layer has the intralayer connecting flow path, and the flow path is so divided as not to planarly communicate the divided hydrogen-permeable part-corresponding regions of the tabular member with each other.

10. The hydrogen separation device according to claim 9, wherein in the hydrogen-permeable part-corresponding region, the tabular member to constitute the mixed gas layer and the transmitted gas layer is not kept in airtight contact with the adjacent hydrogen separation layer.

* * * * *